(12) United States Patent
Hosek et al.

(10) Patent No.: US 11,002,566 B2
(45) Date of Patent: May 11, 2021

(54) POSITION FEEDBACK FOR SELF BEARING MOTOR

(75) Inventors: Martin Hosek, Lowell, MA (US);
Jairo Moura, Marlboro, MA (US); Jay Krishnasamy, Billerica, MA (US); Jeff Paranay, Dracut, MA (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

(21) Appl. No.: 12/901,146

(22) Filed: Oct. 8, 2010

(65) Prior Publication Data

US 2011/0025310 A1 Feb. 3, 2011

Related U.S. Application Data

(62) Division of application No. 12/163,984, filed on Jun. 27, 2008, now Pat. No. 7,834,618.

(Continued)

(51) Int. Cl.
*G01D 5/14* (2006.01)
*G01D 5/245* (2006.01)

(52) U.S. Cl.
CPC ............ *G01D 5/147* (2013.01); *G01D 5/145* (2013.01); *G01D 5/2451* (2013.01)

(58) Field of Classification Search
CPC .... G01D 5/2233; G01D 5/2241; G01D 5/225; G01D 5/2258; G01D 5/2266; G01D 5/2275; G01D 5/2283; G01D 5/2033; G01D 5/204; G01D 5/2046; G01D 5/2053; G01D 5/206; G01D 5/22; G01D 5/2208; G01D 5/2216; G01D 5/2225; G01D 5/14; G01D 5/142; G01D 5/145; G01D 5/147; G01D 5/16; G01D 5/20; G01D 5/2006; G01D 5/2013; G01D 5/202; G01D 5/2026;

(Continued)

(56) References Cited

U.S. PATENT DOCUMENTS 2,564,221 A 8/1951 Hornfeck
3,205,485 A 9/1965 Bernard
(Continued)

FOREIGN PATENT DOCUMENTS

AR 000493 7/1997
AT 252203 11/2003
(Continued)

OTHER PUBLICATIONS

Arreola, Rafael Becerril, Nonlinear Control design for a Magnetic Leviatation System, Thesis for Master of Applied Science, 2003, http://www.control.utoronto.ca/lab/references/Rafael_Becerril_03.pdf.

(Continued)

*Primary Examiner* — David M Schindler
(74) *Attorney, Agent, or Firm* — Perman & Green, LLP; Colin C. Durham

(57) ABSTRACT

A sensing mechanism includes a magnetic source, a magnetic flux sensor, a sensor backing on which the magnetic source and flux sensor are mounted, and a ferromagnetic target, where the magnetic source, magnetic flux sensor, and ferromagnetic target are positioned to form a magnetic circuit from the magnetic source to the target, from the target to the sensor, and returning to the magnetic source through the sensor backing.

11 Claims, 21 Drawing Sheets

Related U.S. Application Data

(60) Provisional application No. 60/946,686, filed on Jun. 27, 2007.

(58) Field of Classification Search
CPC .......... G01D 5/12; G01D 5/2451; G01B 7/02;
G01B 7/023; G01B 7/04; G01B 7/046;
G01B 7/14; G01B 7/305; G01B 7/31;
G01B 7/312; G01B 7/30; G01R 15/20;
G01R 15/202; G01R 15/205
USPC .............. 324/207.2, 207.21, 207.22, 207.23,
324/207.24, 207.25, 173, 174, 179;
73/514.39; 338/32 R, 32 H; 257/421,
257/422; 327/510, 511
See application file for complete search history.

(56) References Cited

U.S. PATENT DOCUMENTS

| | | | |
|---|---|---|---|
| 3,560,774 A | 2/1971 | Reeves | |
| 3,697,992 A | 10/1972 | Kleptz | |
| 3,750,151 A | 7/1973 | Dill | |
| 3,860,843 A | 1/1975 | Kawasaki | |
| 4,144,110 A | 3/1979 | Luc | |
| 4,210,865 A | 7/1980 | Nikolaev et al. | |
| 4,360,753 A | 11/1982 | Shannon | |
| 4,547,678 A | 10/1985 | Metzner | |
| 4,556,886 A | 12/1985 | Shimizu et al. | |
| 4,609,332 A | 9/1986 | Miki | |
| 4,628,499 A | 12/1986 | Hammett | |
| 4,659,991 A | 4/1987 | Weischedel | |
| 4,689,945 A | 9/1987 | Lattion | |
| 4,717,874 A | 1/1988 | Ichikawa et al. | |
| 4,774,465 A | 9/1988 | Nilius | |
| 4,874,998 A | 10/1989 | Hollis, Jr | |
| 4,904,937 A * | 2/1990 | Takahashi et al. ...... | 324/207.21 |
| 4,922,197 A | 5/1990 | Juds | |
| 4,956,945 A | 9/1990 | Ooshima | |
| 4,992,733 A | 2/1991 | Griebeler | |
| 5,003,260 A | 3/1991 | Auchterlonie | |
| 5,015,998 A | 5/1991 | Ellis et al. | |
| 5,038,243 A * | 8/1991 | Gordon ................. | H03M 1/287 |
| | | | 250/231.13 |
| 5,092,453 A | 3/1992 | Bruke | |
| 5,105,113 A | 4/1992 | Ishikura | |
| 5,113,102 A | 5/1992 | Gilmor | |
| 5,120,034 A | 6/1992 | Van Engelen | |
| 5,124,863 A | 6/1992 | Koizumi | |
| 5,126,610 A | 6/1992 | Fremerey | |
| 5,202,695 A | 4/1993 | Hollandsworth | |
| 5,204,621 A | 4/1993 | Hermann et al. | |
| 5,210,490 A | 5/1993 | Munch | |
| 5,270,600 A | 12/1993 | Hashimoto | |
| 5,285,154 A | 2/1994 | Burreson | |
| 5,324,155 A | 6/1994 | Goodwin | |
| 5,334,892 A | 8/1994 | Chitayat | |
| 5,339,030 A * | 8/1994 | Hayashi ................. | G01B 7/312 |
| | | | 318/661 |
| 5,351,004 A | 9/1994 | Daniels | |
| 5,382,900 A * | 1/1995 | Hayashi ................. | G01B 7/312 |
| | | | 324/207.21 |
| 5,386,738 A | 2/1995 | Havenhill | |
| 5,444,368 A | 8/1995 | Horber | |
| 5,450,009 A | 9/1995 | Murakami | |
| 5,469,053 A | 11/1995 | Laughlin | |
| 5,530,306 A | 6/1996 | Ueyama | |
| 5,532,531 A | 7/1996 | Sakamoto | |
| 5,550,413 A | 8/1996 | Bernus | |
| 5,555,715 A | 9/1996 | Paweletz | |
| 5,568,048 A | 10/1996 | Schroeder | |
| 5,574,364 A | 11/1996 | Kajimoto | |
| 5,589,769 A | 12/1996 | Krahn | |
| 5,606,256 A | 2/1997 | Takei | |
| 5,625,240 A | 4/1997 | Bernus | |
| 5,633,545 A | 5/1997 | Albrecht | |
| 5,641,054 A | 6/1997 | Mori et al. | |
| 5,642,298 A | 6/1997 | Mallory | |
| 5,656,902 A | 8/1997 | Lowrance | |
| 5,670,876 A | 9/1997 | Dilger | |
| 5,741,113 A | 4/1998 | Bacchi | |
| 5,748,005 A * | 5/1998 | McCormick ........ | F16C 32/0446 |
| | | | 310/90.5 |
| 5,753,991 A | 5/1998 | Couture | |
| 5,754,042 A * | 5/1998 | Schroeder ................ | G01B 7/30 |
| | | | 324/207.21 |
| 5,801,721 A | 9/1998 | Gandy | |
| 5,808,389 A | 9/1998 | Stephenson | |
| 5,808,437 A | 9/1998 | Schob | |
| 5,813,823 A | 9/1998 | Hofmeister | |
| 5,818,137 A | 10/1998 | Nichols | |
| 5,838,121 A | 11/1998 | Fairbairn | |
| 5,886,432 A | 3/1999 | Markle | |
| 5,899,658 A | 5/1999 | Hofmeister | |
| 5,914,548 A | 6/1999 | Watanabe | |
| 5,924,975 A | 7/1999 | Goldowsky | |
| 5,932,947 A | 8/1999 | Kim | |
| 5,922,882 A | 9/1999 | Eisschiel et al. | |
| 5,955,882 A | 9/1999 | Eisschiel | |
| 5,961,291 A | 10/1999 | Sakagami | |
| 6,015,272 A | 1/2000 | Antaki | |
| 6,018,881 A | 2/2000 | Spies | |
| 6,049,148 A | 4/2000 | Nichols | |
| 6,054,851 A | 4/2000 | Masreliez et al. | |
| 6,058,760 A | 5/2000 | Van Heyningen | |
| 6,074,180 A | 6/2000 | Khanwilkar et al. | |
| 6,078,119 A | 6/2000 | Satoh | |
| 6,085,760 A | 7/2000 | Chodorow | |
| 6,086,362 A | 7/2000 | White | |
| 6,096,231 A | 8/2000 | Schertler | |
| 6,097,183 A | 8/2000 | Goetz et al. | |
| 6,100,618 A | 8/2000 | Schoeb | |
| 6,100,681 A | 8/2000 | Tsuruta | |
| 6,127,749 A | 10/2000 | Sogard | |
| 6,144,132 A | 11/2000 | Nashiki | |
| 6,147,421 A | 11/2000 | Takita | |
| 6,158,941 A | 12/2000 | Muka et al. | |
| 6,163,148 A * | 12/2000 | Takada et al. ................. | 324/226 |
| 6,175,174 B1 | 1/2001 | Takahashi | |
| 6,176,668 B1 | 1/2001 | Kurita | |
| 6,189,404 B1 | 2/2001 | Hatake | |
| 6,191,415 B1 | 2/2001 | Stridsberg | |
| 6,206,176 B1 | 3/2001 | Blonigan | |
| 6,208,045 B1 | 3/2001 | Hazelton | |
| 6,209,045 B1 | 3/2001 | Hasegawa | |
| 6,227,817 B1 | 5/2001 | Paden | |
| 6,235,172 B1 | 5/2001 | Begin | |
| 6,244,835 B1 | 6/2001 | Antaki | |
| 6,246,233 B1 | 6/2001 | Griffen | |
| 6,249,067 B1 * | 6/2001 | Schob et al. ................. | 310/68 B |
| 6,261,247 B1 | 7/2001 | Ishikawa | |
| 6,269,552 B1 | 8/2001 | Honda | |
| 6,285,097 B1 | 9/2001 | Hazelton | |
| 6,285,107 B1 | 9/2001 | Sawada | |
| 6,299,404 B1 | 10/2001 | Muka et al. | |
| 6,324,134 B1 | 11/2001 | Ohtachi | |
| 6,326,750 B1 | 12/2001 | Marcinkiewicz | |
| 6,373,159 B1 | 4/2002 | Shinozaki | |
| 6,384,500 B1 | 5/2002 | Chassoulier | |
| 6,414,742 B1 | 7/2002 | Korenaga | |
| 6,416,215 B1 | 7/2002 | Terentiev | |
| 6,431,011 B1 | 8/2002 | Feller | |
| 6,445,093 B1 | 9/2002 | Binnard | |
| 6,447,265 B1 | 9/2002 | Antaki | |
| 6,447,266 B2 | 9/2002 | Antaki | |
| 6,448,760 B1 | 9/2002 | Neumann | |
| 6,471,459 B2 | 10/2002 | Blonigan | |
| 6,485,250 B2 | 11/2002 | Hofmeister | |
| 6,485,531 B1 | 11/2002 | Schöb | |
| 6,498,411 B2 | 12/2002 | Kanebako | |
| 6,498,451 B1 * | 12/2002 | Boules et al. ................. | 318/661 |
| 6,499,701 B1 | 12/2002 | Thornton et al. | |
| 6,509,732 B1 | 1/2003 | Rhodes et al. | |
| 6,522,130 B1 | 2/2003 | Lutz | |
| 6,532,791 B2 | 3/2003 | Schmid | |

(56) References Cited

U.S. PATENT DOCUMENTS

| | | | |
|---|---|---|---|
| 6,537,011 B1 | 3/2003 | Wang |
| 6,557,957 B2 | 5/2003 | Nagata |
| 6,559,567 B2 | 5/2003 | Schöb |
| 6,559,637 B2 | 5/2003 | Miyata |
| 6,563,306 B2 | 5/2003 | Sato |
| 6,573,088 B2 | 6/2003 | Gemmell |
| 6,580,190 B2 | 6/2003 | Takasu |
| 6,595,762 B2 | 7/2003 | Khanwilkar et al. |
| 6,617,739 B1 | 9/2003 | Kinoshita |
| 6,621,245 B2 | 9/2003 | Vaassen |
| 6,625,517 B1 | 9/2003 | Bogdanov |
| 6,629,883 B2 | 10/2003 | Katsuoka et al. |
| 6,642,711 B2 | 11/2003 | Kawate |
| 6,646,721 B2 | 11/2003 | Compter |
| 6,650,079 B2 | 11/2003 | Binnard |
| 6,661,220 B1 | 12/2003 | Glehr |
| 6,690,159 B2 | 2/2004 | Burreson et al. |
| 6,691,074 B1 | 2/2004 | Moriya |
| 6,698,737 B1 | 3/2004 | Blessing |
| 6,707,200 B2 | 3/2004 | Carroll |
| 6,731,107 B2 * | 5/2004 | Reverdy ............... 324/207.16 |
| 6,737,826 B2 | 5/2004 | Gilchrist |
| 6,781,524 B1 | 8/2004 | Clark |
| 6,784,580 B2 | 8/2004 | Yashiro |
| 6,800,833 B2 | 10/2004 | Gregor |
| 6,803,758 B1 | 10/2004 | Nicholson |
| 6,809,450 B1 | 10/2004 | Morrison |
| 6,810,754 B2 | 11/2004 | May |
| 6,813,543 B2 | 11/2004 | Aalund |
| 6,864,955 B2 | 3/2005 | Nishi |
| 6,876,896 B1 | 4/2005 | Ortiz |
| 6,877,963 B2 | 4/2005 | Beyer |
| 6,878,044 B2 | 4/2005 | Sakurai |
| 6,879,063 B2 | 4/2005 | Frissen |
| 6,879,076 B2 | 4/2005 | Long |
| 6,879,126 B2 | 4/2005 | Paden et al. |
| 6,902,646 B2 | 6/2005 | Mahoney et al. |
| 6,909,281 B2 | 6/2005 | Gassman |
| 6,916,231 B2 | 7/2005 | Wakabayashi |
| 6,917,136 B2 | 7/2005 | Thornton |
| 6,927,505 B2 | 8/2005 | Binnard |
| 6,927,840 B2 | 8/2005 | Lee |
| 6,940,274 B2 | 9/2005 | Wakiyama et al. |
| 6,952,086 B1 | 10/2005 | Krefta |
| 6,967,424 B2 | 11/2005 | Popov |
| 6,989,647 B1 | 1/2006 | Lee |
| 6,991,710 B2 | 1/2006 | Harris |
| 6,995,534 B2 | 2/2006 | Berroth |
| 7,005,847 B2 | 2/2006 | Gassman |
| 7,023,118 B1 | 4/2006 | Morrison |
| 7,030,528 B2 | 4/2006 | Morgante |
| 7,053,582 B2 | 5/2006 | Ueyama |
| 7,067,952 B2 | 6/2006 | Neal |
| 7,070,398 B2 | 7/2006 | Olsen |
| 7,073,521 B2 | 7/2006 | Sakai |
| 7,075,197 B2 | 7/2006 | Korenaga |
| 7,087,143 B1 | 8/2006 | Schmidt |
| 7,115,066 B1 | 10/2006 | Lee |
| 7,135,855 B2 | 11/2006 | Nyce |
| 7,164,120 B2 | 1/2007 | Strasser |
| 7,187,143 B2 | 3/2007 | Okada |
| 7,196,604 B2 | 3/2007 | Sills |
| 7,205,741 B2 | 4/2007 | Simons |
| 7,208,945 B2 | 4/2007 | Jones |
| 7,211,918 B2 | 5/2007 | Migita |
| 7,229,258 B2 | 6/2007 | Wood |
| 7,230,355 B2 | 6/2007 | Lin |
| 7,235,906 B2 | 6/2007 | Carroll |
| RE39,748 E | 7/2007 | Watanabe |
| 7,245,047 B2 | 7/2007 | Vreugdewater |
| 7,246,985 B2 | 7/2007 | Ferrara |
| 7,248,037 B2 | 7/2007 | Hara et al. |
| 7,262,527 B2 | 8/2007 | Neal |
| 7,264,430 B2 | 9/2007 | Bischof |
| 7,292,656 B2 | 11/2007 | Kloper |
| 7,315,164 B2 | 1/2008 | Hata et al. |
| 7,319,319 B2 | 1/2008 | Jones et al. |
| 7,325,559 B2 | 2/2008 | Darut |
| 7,339,370 B2 | 3/2008 | Reimer |
| 7,352,553 B2 | 4/2008 | Kozaki |
| 7,359,032 B2 | 4/2008 | Dansberg |
| 7,371,306 B2 | 5/2008 | Davis |
| 7,400,141 B2 | 7/2008 | Taniguchi |
| 7,424,830 B2 | 9/2008 | Matsusaki et al. |
| 7,467,930 B2 | 12/2008 | Ozaki |
| 7,468,589 B2 | 12/2008 | Cox |
| 7,508,099 B2 | 3/2009 | Korenaga |
| 7,518,273 B2 | 4/2009 | Kataoka |
| 7,522,267 B2 | 4/2009 | Hofmeister et al. |
| 7,575,406 B2 | 8/2009 | Hofmeister |
| 7,578,649 B2 | 8/2009 | Caveney |
| 7,596,425 B2 | 9/2009 | Asa |
| 7,633,201 B2 | 12/2009 | Buhler |
| 7,642,733 B2 | 1/2010 | Shen |
| 7,795,861 B2 | 9/2010 | Englert |
| 7,843,101 B2 | 11/2010 | Ito |
| 7,868,610 B2 | 1/2011 | Velinsky |
| 7,897,025 B2 | 3/2011 | Inoue |
| 7,906,959 B2 | 3/2011 | Frachon |
| 8,052,504 B2 | 11/2011 | Kalenian |
| 8,104,488 B2 | 1/2012 | Rye |
| 8,129,984 B2 | 3/2012 | Hosek et al. |
| 2001/0033115 A1 | 10/2001 | Heine et al. |
| 2001/0036398 A1 | 11/2001 | Hofmeister |
| 2001/0044266 A1 | 11/2001 | Katsuoka et al. |
| 2001/0045828 A1 * | 11/2001 | Naidu ............... G01D 5/147 |
| | | 324/207.21 |
| 2001/0051499 A1 | 12/2001 | Shlnozaki |
| 2002/0021423 A1 | 2/2002 | Korenaga et al. |
| 2002/0025089 A1 * | 2/2002 | Mori ............... F16C 17/107 |
| | | 384/100 |
| 2002/0041168 A1 | 4/2002 | Mann et al. |
| 2002/0060548 A1 | 5/2002 | Iwaji et al. |
| 2002/0089324 A1 | 7/2002 | Miyata et al. |
| 2002/0097042 A1 | 7/2002 | Kawate |
| 2002/0105241 A1 | 8/2002 | Carroll |
| 2002/0135358 A1 * | 9/2002 | Sager et al. ............... 324/204 |
| 2002/0149270 A1 | 10/2002 | Hazelton |
| 2002/0153790 A1 | 10/2002 | Hideki et al. |
| 2003/0011338 A1 | 1/2003 | Gilchrist |
| 2003/0085676 A1 | 5/2003 | Binnard |
| 2003/0102721 A1 | 6/2003 | Ueta |
| 2003/0223853 A1 | 12/2003 | Caveney |
| 2003/0236644 A1 | 12/2003 | Lara et al. |
| 2004/0021437 A1 | 2/2004 | Maslov |
| 2004/0056617 A1 | 3/2004 | Berroth |
| 2004/0070300 A1 | 4/2004 | Fu |
| 2004/0072499 A1 | 4/2004 | Wakabayashi |
| 2004/0075426 A1 | 4/2004 | Wakiyama et al. |
| 2004/0151562 A1 | 8/2004 | Hofmeister |
| 2004/0194565 A1 | 10/2004 | Okada |
| 2004/0217667 A1 | 11/2004 | Popov |
| 2004/0261550 A1 | 12/2004 | Asa |
| 2004/0261944 A1 | 12/2004 | Wakabayashi et al. |
| 2005/0002743 A1 | 1/2005 | Moriya et al. |
| 2005/0151544 A1 | 7/2005 | Mahoney |
| 2005/0184689 A1 | 8/2005 | Maslov et al. |
| 2005/0188798 A1 | 9/2005 | Bischof et al. |
| 2005/0242576 A1 | 11/2005 | Darut et al. |
| 2005/0264119 A1 | 12/2005 | Carroll |
| 2005/0265814 A1 | 12/2005 | Coady |
| 2005/0269892 A1 | 12/2005 | Duff |
| 2005/0280411 A1 * | 12/2005 | Bicking ............... 324/207.21 |
| 2006/0017340 A1 | 1/2006 | Kozaki et al. |
| 2006/0018774 A1 | 1/2006 | Casaro |
| 2006/0091759 A1 | 5/2006 | Migita et al. |
| 2006/0099063 A1 | 5/2006 | Pietrantonio et al. |
| 2006/0113949 A1 | 6/2006 | Nishimura et al. |
| 2006/0125334 A1 | 6/2006 | Kataoka et al. |
| 2006/0164697 A1 | 7/2006 | Larson |
| 2006/0205553 A1 | 9/2006 | Lee |
| 2006/0219275 A1 | 10/2006 | Weber |
| 2006/0238053 A1 | 10/2006 | Kascak |
| 2006/0275155 A1 | 12/2006 | Thibodeau |

(56) References Cited

U.S. PATENT DOCUMENTS

| | | |
|---|---|---|
| 2006/0279149 A1 | 12/2006 | Asper |
| 2007/0020081 A1 | 1/2007 | Gilchrist et al. |
| 2007/0065144 A1 | 3/2007 | Hofmeister et al. |
| 2007/0120556 A1 | 5/2007 | Dufour |
| 2007/0164697 A1 | 7/2007 | Cox |
| 2008/0067968 A1 | 3/2008 | Binnard |
| 2008/0116881 A1 | 5/2008 | May |
| 2008/0120164 A1 | 5/2008 | Hassler |
| 2008/0121064 A1 | 5/2008 | Todorov |
| 2009/0243413 A1 | 10/2009 | Gilchrist et al. |
| 2010/0178135 A1 | 7/2010 | Laceky et al. |

FOREIGN PATENT DOCUMENTS

| | | |
|---|---|---|
| AT | 375621 | 10/2007 |
| AU | 2442284 | 10/1984 |
| AU | 4436985 | 12/1985 |
| AU | 557516 | 12/1986 |
| AU | 3865695 | 6/1996 |
| AU | 7736496 | 6/1997 |
| AU | 2827697 | 11/1997 |
| BR | 9508702 | 8/1997 |
| BR | 9611550 | 12/1999 |
| BR | 9709047 | 1/2000 |
| CA | 1244087 | 11/1988 |
| CA | 2191128 | 6/1996 |
| CA | 2253435 | 11/1997 |
| CN | 1157675 | 8/1997 |
| CN | 1203660 | 12/1998 |
| CN | 1226307 A | 8/1999 |
| CN | 1360536 | 7/2002 |
| CN | 1451148 | 10/2003 |
| CN | 1457434 | 11/2003 |
| CN | 1129778 | 12/2003 |
| CN | 1493852 | 5/2004 |
| CN | 1582385 | 2/2005 |
| CN | 1759051 | 4/2006 |
| CN | 1278104 | 10/2006 |
| CN | 1281927 | 10/2006 |
| CN | 1928500 | 3/2007 |
| CN | 1976171 | 6/2007 |
| CN | 101305318 | 11/2008 |
| DE | 69725565 | 7/2004 |
| DE | 60036665 | 11/2008 |
| EP | 0121084 | 10/1984 |
| EP | 121084 A2 | 10/1984 |
| EP | 129731 A1 | 1/1985 |
| EP | 0182880 | 6/1986 |
| EP | 414127 A1 | 2/1991 |
| EP | 526903 A1 | 2/1993 |
| EP | 565746 A1 | 10/1993 |
| EP | 641061 A2 | 3/1995 |
| EP | 675824 A1 | 10/1995 |
| EP | 758157 A2 | 2/1997 |
| EP | 760244 A1 | 3/1997 |
| EP | 0795229 | 9/1997 |
| EP | 816701 A1 | 1/1998 |
| EP | 0819330 | 1/1998 |
| EP | 0861417 | 9/1998 |
| EP | 0883467 | 12/1998 |
| EP | 0897476 | 2/1999 |
| EP | 897476 A1 | 2/1999 |
| EP | 1052761 A2 | 11/2000 |
| EP | 1054498 A1 | 11/2000 |
| EP | 1061640 | 12/2000 |
| EP | 1081390 A2 | 3/2001 |
| EP | 1114648 A2 | 7/2001 |
| EP | 1139711 | 10/2001 |
| EP | 1176999 A1 | 2/2002 |
| EP | 1277186 | 1/2003 |
| EP | 1400778 | 3/2004 |
| EP | 1442273 | 8/2004 |
| EP | 1450462 | 8/2004 |
| EP | 1732011 A1 | 12/2006 |
| EP | 1736736 | 12/2006 |
| EP | 1904893 | 4/2008 |
| EP | 1535313 | 5/2010 |
| GB | 1552874 A | 9/1979 |
| GB | 2035622 A | 6/1980 |
| HK | 1016688 | 12/2004 |
| JP | 57165702 A | 10/1982 |
| JP | 61152304 | 7/1986 |
| JP | 61152304 A | 7/1986 |
| JP | 2-4024 | 6/1988 |
| JP | 1023468 | 1/1989 |
| JP | 1023468 A | 1/1989 |
| JP | 1240268 | 9/1989 |
| JP | 1240268 A | 9/1989 |
| JP | 02036313 | 2/1990 |
| JP | 02193547 | 7/1990 |
| JP | 7255158 | 6/1991 |
| JP | 3178747 A | 8/1991 |
| JP | 3-125212 | 12/1991 |
| JP | 3276317 A | 12/1991 |
| JP | 0494581 | 3/1992 |
| JP | 4209996 A | 7/1992 |
| JP | 4308823 A | 10/1992 |
| JP | 4-333421 | 11/1992 |
| JP | 04364752 A | 12/1992 |
| JP | 5130762 | 5/1993 |
| JP | 05346322 A | 12/1993 |
| JP | 6-23687 | 2/1994 |
| JP | 623687 | 2/1994 |
| JP | 6213233 A | 8/1994 |
| JP | 7012091 A | 1/1995 |
| JP | 07255158 | 3/1995 |
| JP | 7131966 A | 5/1995 |
| JP | 7161790 | 6/1995 |
| JP | 07317673 | 12/1995 |
| JP | 8323505 | 12/1996 |
| JP | 8323505 A | 12/1996 |
| JP | 09093723 | 4/1997 |
| JP | 09269007 | 10/1997 |
| JP | 10023781 A | 1/1998 |
| JP | 10284891 | 10/1998 |
| JP | 10316241 A | 12/1998 |
| JP | 11030502 A | 2/1999 |
| JP | 11166803 | 6/1999 |
| JP | 11190786 | 7/1999 |
| JP | 11257909 | 9/1999 |
| JP | 2000500862 | 1/2000 |
| JP | 2000503478 | 3/2000 |
| JP | 2000131006 A | 5/2000 |
| JP | 2000138275 | 5/2000 |
| JP | 2000510928 | 8/2000 |
| JP | 2001025280 | 1/2001 |
| JP | 3147568 | 3/2001 |
| JP | 2001074006 A | 3/2001 |
| JP | 2001156150 | 6/2001 |
| JP | 2001156150 A | 6/2001 |
| JP | 2001224154 | 8/2001 |
| JP | 2001284876 | 10/2001 |
| JP | 2001351874 | 12/2001 |
| JP | 2001351874 A | 12/2001 |
| JP | 2002026105 | 1/2002 |
| JP | 2002026105 A | 1/2002 |
| JP | 2002511571 A | 4/2002 |
| JP | 2002247823 | 8/2002 |
| JP | 2003068620 | 3/2003 |
| JP | 2004505823 | 2/2004 |
| JP | 2004122253 | 4/2004 |
| JP | 2004132972 | 4/2004 |
| JP | 2004245703 | 9/2004 |
| JP | 2004245703 A | 9/2004 |
| JP | 2004254496 | 9/2004 |
| JP | 2004-308823 | 11/2004 |
| JP | 3630964 | 3/2005 |
| JP | 2005507496 | 3/2005 |
| JP | 2005158826 A | 6/2005 |
| JP | 2005517946 | 6/2005 |
| JP | 2005223997 | 8/2005 |
| JP | 2005223997 A | 8/2005 |
| JP | 2005534176 | 11/2005 |
| JP | 2005534176 A | 11/2005 |

(56) References Cited

FOREIGN PATENT DOCUMENTS

| | | | |
|---|---|---|---|
| JP | 2006013371 A | 1/2006 |
| JP | 2006214736 A | 8/2006 |
| JP | 2006237084 | 9/2006 |
| JP | 2007019216 | 1/2007 |
| JP | 2007024694 A | 2/2007 |
| JP | 2007502519 | 2/2007 |
| JP | 2007159196 | 6/2007 |
| JP | 200614592 A | 8/2007 |
| JP | 2008001475 | 1/2008 |
| JP | 4076581 | 4/2008 |
| JP | 4084417 | 4/2008 |
| JP | 2008516457 A | 5/2008 |
| JP | 2008196894 A | 8/2008 |
| JP | 2009506518 | 2/2009 |
| JP | 4275535 | 6/2009 |
| JP | 4304284 | 7/2009 |
| JP | 4341140 | 10/2009 |
| JP | 4402922 | 1/2010 |
| JP | 10070865 A | 4/2010 |
| JP | 4712379 | 6/2011 |
| JP | 4712379 B2 | 6/2011 |
| JP | 2011139086 | 7/2011 |
| JP | 5015596 | 8/2012 |
| JP | 61-172077 | 8/2013 |
| KR | 20000010735 | 2/2000 |
| KR | 20010066851 | 7/2001 |
| KR | 2006067957 | 6/2006 |
| KR | 100790914 | 1/2008 |
| KR | 20080033358 | 4/2008 |
| KR | 101028065 | 4/2011 |
| MX | 9700858 | 4/1997 |
| SG | 60170702 | 9/1985 |
| WO | 1985005710 | 12/1985 |
| WO | WO1989012907 A1 | 12/1989 |
| WO | WO1994014653 A1 | 7/1994 |
| WO | 1996017429 | 6/1996 |
| WO | 1996031934 | 10/1996 |
| WO | 1997018441 | 5/1997 |
| WO | 1997026117 | 7/1997 |
| WO | 1997042413 | 11/1997 |
| WO | WO1997042413 A1 | 11/1997 |
| WO | WO1998037335 A1 | 8/1998 |
| WO | WO1999004481 A1 | 1/1999 |
| WO | 9953266 | 10/1999 |
| WO | 2000064662 | 11/2000 |
| WO | 2000064741 | 11/2000 |
| WO | 2000064742 | 11/2000 |
| WO | 2000064751 | 11/2000 |
| WO | 2000064753 | 11/2000 |
| WO | 2000064791 | 11/2000 |
| WO | WO2001002211 A1 | 1/2001 |
| WO | WO2001002721 A1 | 1/2001 |
| WO | 2001071684 | 9/2001 |
| WO | WO2002031372 A1 | 4/2002 |
| WO | WO2002041473 A1 | 5/2002 |
| WO | 2003003539 | 1/2003 |
| WO | WO2003029651 A2 | 4/2003 |
| WO | 2003038379 | 5/2003 |
| WO | 200307123 | 8/2003 |
| WO | 2003101879 | 12/2003 |
| WO | 2004010476 | 1/2004 |
| WO | WO2004098677 A1 | 11/2004 |
| WO | WO2005003565 A1 | 1/2005 |
| WO | 2005017937 | 2/2005 |
| WO | WO2005030296 A2 | 4/2005 |
| WO | WO2005114848 A1 | 12/2005 |
| WO | WO2006010285 A1 | 2/2006 |
| WO | WO2006053384 A1 | 5/2006 |
| WO | 2007008941 | 1/2007 |
| WO | 2007029623 A1 | 3/2007 |
| WO | WO2007068496 A1 | 6/2007 |
| WO | 2008039943 A2 | 4/2008 |
| WO | 2009003186 A1 | 12/2008 |

OTHER PUBLICATIONS

Arreola, Rafael Becerril, Output feedback nonlinear control for a linear motor in suspension mode, Automatica, 2004, Elsevier, 2004.
Benarous et al., Sinusoidal Shaft Position Encoder, Mar. 31-Apr. 2-3, 2004, IEEE Conference Publication 2004, No. 498, pp. 132-136, IEEE International Conference on Power Electronics, Machines and Drives.
Duan et al., Analysis and comparison of two-dimensional permanent magnet array for planar motor, Magnetics, IEEE Transactions, Nov. 2004, vol. 40, pp. 3490-3494.
Etxaniz et al., Design of Magnetically levitated 2D drive, COMPEL, 2006, vol. 25, pp. 732-740, Emerald Group Publishing Ltd.
Gallo, C.A., Halbach Magnetic Rotor Development, NASA Glenn Research Center, Report No. NASA1TM-2008-215056; E-16281, Feb. 2008, p. 27, CAS?.
Goa et al., A surface motor-driven planar motion stage integrated with an XYO(z) surface encoder for precision positioning, Precision Engineering Journal of the International Societies for Precision Engineering and Nanotechnology, 2004, vol. 28, pp. 329-337.
Jang et al., Design and analysis of helical motion permanent magnet motor with cylindrical Halbach array, IEEE Transactions, Sep. 2003, vol. 39, pp. 3007-3009.
Kawato et al., A Novel Multi-DOF Precision Positioning Methodology Using Two-Axis Hall-Effect Sensors, 2005 American Control Conference, Jun. Aug. 10, 2005, pp. 3042-3047, IEEE.
Kim et al., Analysis and implementation of a tubular motor with Halbach magnetarray, Industry Application Conference, 1996, vol. 1, pp. 471-478, San Diego, CA, IEEE.
Kim et al., Design and Control of a 6-DOF High-Precision Integrated Positioner, Proceeding of the 2004 American Control Conference, Boston, Massachusetts, Jun. 30-Jul. 2, 2004, pp. 2493-2498, 2004, AACC.
Konkola et al., Electromagnetic design of a low-fringing-field magnetic bearing stage for electron beam lithography: Special issue on magnetic bearing, JSME international journal, Series C, Mechanical Systems, 2003, vol. 46, pp. 370-377.
Park et al., Analysis and Control of 2-D of Magnetic Levitation Stage Using Force Decoupling Theorem, SICE-ICASE, 2006, pp. 1091-1095.
Popovic et al., A New CMOS Hall Angular Position Sensor, Technisches Messen, 2001, pp. 286-291, vol. 68, No. 6, Jun., Swiss Fed. Institute Tech., Lausanne, Switzerland.
Precision Engineering, The Long-Range Scanning Stage: A Novel Platform for Scanned-Probe Microscopy, Journal of the International Societies for Precision Engineering and Nanotechnology, 2000, pp. 191-209, vol. 24, Elsevier Science, Inc., United States.
Rajagopal et al., Static Torque Profiles of a Hybrid Stepper Motor Having Eccentricity Between Stator and Rotor Axes, May 15, 2003, pp. 8701-8703, vol. 93, No. 10, A.I.P., Journal of Applied Physics, United States.
Schott et al., A New Two-Axis Magnetic Position Sensor, 2002, pp. 911-915, IEEE.
Thornton et al., The MangeMotion Maglev System M3, TRB 2003 Annual Meeting CD-ROM, pp. 1-15, 2003.
Wereb, J.A., Sine-Cosine Rotation Sensor for 360 Degree Angle Measurement Sensors, 995, pp. 40-41, vol. 12, No. 11, Elweco, Inc., United States.
Yan et al., Coding of Shared Track Grey Encoder, Journal of Dynamic Systems, Measurement and Control, vol. 122, pp. 573-576, ASME.
Zhang et al., A Study of the Rotor Eccentricity Compensation of Bearingless Induction Motor, Jun. 2004, pp. 148-150, vol. 8, No. 2, Editorial Board of Electric Machines & Control, China.
International Preliminary Report on Patentability dated Aug. 12, 2009; Application PCT/US08/68682.
International Preliminary Report on Patentability dated Sep. 11, 2009; Application PCT/US08/68160.
International Preliminary Report on Patentability dated Sep. 22, 2009; Application PCT/US08/68167.
International Preliminary Report on Patentability dated Dec. 10, 2009; Application PCT/US08/68680.

(56) References Cited

OTHER PUBLICATIONS

International Preliminary Report on Patentability dated Jan. 5, 2010; Application PCT/US08/68684.
International Preliminary Report on Patentability dated Jan. 25, 2011; Application PCT/US08/68661.
Taiwan IPO search Report, Application No. 097124040, dated May 19, 2013, 1 page.
IPRP, PCT/US2008/070346, dated Jan. 19, 2010, 6 pages.
International Search Report, PCT/US2008/068670, dated Sep. 2, 2008, 1 page.
International Search Report, PCT/US2008/068682, dated Sep. 3, 2008, 1 page.
International Search Report, PCT/US2008/068680, dated Sep. 3, 2008, 2 pages.
International Search Report, PCT/US2008/068167, dated Sep. 11, 2008, 1 page.
International Search Report, PCT/US2008/068160, dated Sep. 11, 2008, 1 page.
International Search Report, PCT/US2008/070346, dated Oct. 7, 2008, 1 page.
International Search Report, PCT/US2008/068684, dated Oct. 9, 2008, 1 page.
International Search Report, PCT/US2008/068661, dated Oct. 22, 2008, 1 page.
Chinese Search Report, Application No. 200880104667.9 dated Sep. 27, 2012.
Taiwan IPO Search Report, Application No. 097124035, dated Jul. 31, 2013.
Taiwan IPO Search Report, Application No. 097124039 dated Aug. 1, 2013.
Taiwan IPO Search Report, Application No. 097124034 dated Aug. 1, 2013.

\* cited by examiner

| SENSOR NUMBER AND CORRESPONDING DIGITAL OUTPUTS | | | | | ANGULAR POSITION (DEG) |
|---|---|---|---|---|---|
| S4 | S3 | S2 | S1 | S0 | 12 |
| 0 | 0 | 1 | 0 | 1 | 24 |
| 0 | 0 | 0 | 0 | 1 | 36 |
| 0 | 0 | 0 | 1 | 1 | 48 |
| 0 | 0 | 1 | 1 | 1 | 60 |
| 0 | 1 | 0 | 1 | 1 | 72 |
| 0 | 1 | 0 | 1 | 0 | 84 |
| 0 | 0 | 0 | 1 | 0 | 96 |
| 0 | 0 | 1 | 1 | 0 | 108 |
| 0 | 1 | 1 | 1 | 0 | 120 |
| 1 | 1 | 1 | 1 | 0 | 132 |
| 1 | 0 | 1 | 1 | 0 | 144 |
| 1 | 0 | 1 | 0 | 0 | 156 |
| 0 | 0 | 1 | 0 | 0 | 168 |
| 0 | 1 | 1 | 0 | 0 | 180 |
| 1 | 1 | 1 | 0 | 0 | 192 |
| 1 | 1 | 1 | 0 | 1 | 204 |
| 0 | 1 | 1 | 0 | 1 | 216 |
| 0 | 1 | 0 | 0 | 1 | 228 |
| 0 | 1 | 0 | 0 | 0 | 240 |
| 1 | 1 | 0 | 0 | 0 | 252 |
| 1 | 1 | 0 | 0 | 1 | 264 |
| 1 | 1 | 0 | 1 | 1 | 276 |
| 1 | 1 | 0 | 1 | 0 | 288 |
| 1 | 0 | 0 | 1 | 0 | 300 |
| 1 | 0 | 0 | 0 | 0 | 312 |
| 1 | 0 | 0 | 0 | 1 | 324 |
| 1 | 0 | 0 | 1 | 1 | 336 |
| 1 | 0 | 1 | 1 | 1 | 348 |
| 1 | 0 | 1 | 0 | 1 | 360 |

FIG. 10

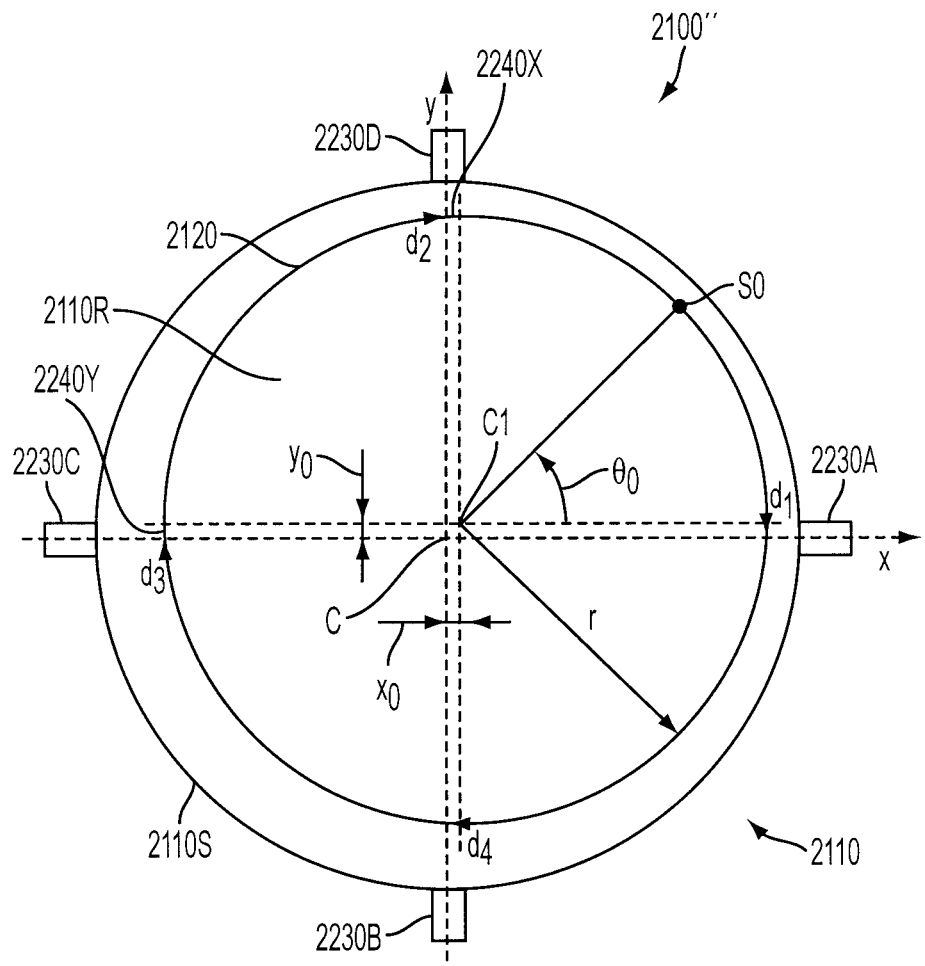

EXACT SOLUTION:

$x_0 = r\cos[(d_2 - d_4)/(2r)]$ $y_0 = r\cos[(d_3 - d_1)/(2r)]$ $\theta_1 = d_1/r - \operatorname{asin}(y_0/r)$ $\theta_2 = d_2/r - 3\pi/2 + \operatorname{asin}(x_0/r)$ $\theta_3 = d_3/r - \pi + \operatorname{asin}(y_0/r)$ $\theta_4 = d_4/r - \pi/2 - \operatorname{asin}(x_0/r)$ $\theta_0 = \sum_{i=1}^{4}\theta_i/4 = (d_1 + d_2 + d_3 + d_4)/(4r) - 3\pi/4$

APPROXIMATION:

$x_0 = -(d_2 - d_4 - \pi r)/2 = (d_4 - d_2 + \pi r)/2$ $y_0 = -(d_3 - d_1 - \pi r)/2 = (d_1 - d_3 + \pi r)/2$ $\theta_1 = (d_1 - y_0)/r$ $\theta_2 = (d_2 - 3\pi r/2 + x_0)/r$ $\theta_3 = (d_3 - \pi r + y_0)/r$ $\theta_4 = (d_4 - \pi r/2 - x_0)/r$ $\theta_0 = \sum_{i=1}^{4}\theta_i/4 = (d_1 + d_2 + d_3 + d_4)/(4r) - 3\pi/4$

FIG. 19

POSITION FEEDBACK FOR SELF BEARING MOTOR

This is a divisional of U.S. patent application Ser. No. 12/163,984, filed 27 Jun. 2008, which claims the benefit of U.S. Provisional Patent application 60/946,686, filed 27 Jun. 2007, both of which are incorporated by reference herein in their entirety.

This application is related to U.S. patent application Ser. No. 11/769,688, filed 27 Jun. 2007, U.S. patent application Ser. No. 11/769,651, filed 27 Jun. 2007, U.S. Provisional Patent application 60/946,693, filed 27 Jun. 2007, and U.S. Provisional Patent application 60/946,687, filed 27 Jun. 2007, all of which are incorporated by reference herein in their entirety.

BACKGROUND

The presently disclosed embodiments are directed to determining position, in particular to providing non-contact and non-invasive position determination for a motor.

BRIEF DESCRIPTION OF RELATED DEVELOPMENTS

Motor systems may require measurements of eccentricity and orientation of a reactive element, such as a rotor, in order to maintain a desired gap between a stator and the reactive element to produce a desired amount of motive force, axial and radial stiffness, and to properly control motion of the reactive element. For example, in a self bearing motor, the gap information may typically be obtained from proximity sensors that may detect gaps between the stator and the rotor at various locations. The proximity sensors are often complemented by another measurement device, such as a position resolver, which determines the orientation of the rotor with respect to the stator.

In certain applications, materials must be processed in a controlled, clean atmosphere where microscopic contaminates may represent a severe problem. In those applications, cleanliness may be directly related to yield, which may in turn affect cost. Other applications may include processing steps utilizing hostile atmospheres of highly corrosive gases and high temperatures. Motors with contact bearings may wear, produce particulate contamination, and eventually fail due to the hostile environment. Bearings may also exhibit an unacceptable amount of vibration and play before failing. While self-bearing motors may provide a viable alternative for these applications, it would be undesirable to penetrate or invade the hostile environment with cables or other conductors in order to measure the exact position of the reactive element. Optical techniques may also be disadvantageous because they may require a "window" into the hostile environment that may likewise compromise the integrity of an enclosure containing the environment.

It would be advantageous to provide a system of sensors and scales attached to a motor reactive element such as a rotor to provide accurate position and eccentricity measurements.

It would also be advantageous to have a sensor system that utilizes magnetic flux density in order to accurately measure the position of a rotor and to accurately measure the scales that may be attached to or integral with the reactive element.

It would be also be advantageous to have a motor feedback system that simultaneously measures the eccentricity and orientation of the rotor with respect to the stator without using two types of sensors.

BRIEF DESCRIPTION OF THE DRAWINGS

The foregoing aspects and other features of the disclosed embodiments are explained in the following description, taken in connection with the accompanying drawings, wherein:

FIG. 10 shows a Gray code pattern;

FIG. 19 is a schematic illustration of a feedback system in accordance with an exemplary embodiment;

DETAILED DESCRIPTION OF THE EXEMPLARY EMBODIMENTS

Although the presently disclosed embodiments will be described with reference to the drawings, it should be understood that they may be embodied in many alternate forms. It should also be understood that. In addition, any suitable size, shape or type of elements or materials could be used.

The exemplary embodiments are directed to position sensing systems for motors that provide a desired level of accuracy and repeatability. Additional embodiments include systems for use with motors in hostile or clean environments, in particular, robot drive applications where the rotor and stator may be atmospherically isolated from each other.

Figure 1A:
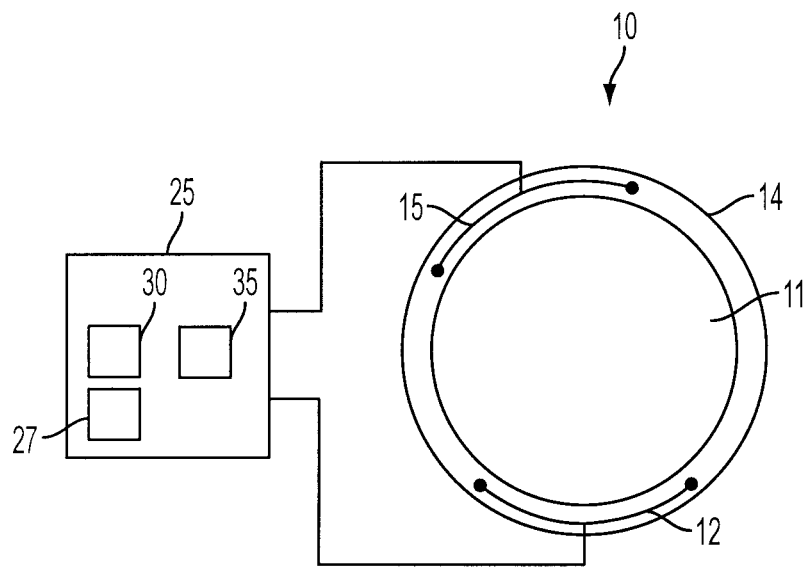
FIGS. 1A and 1B show schematic diagrams of exemplary motors suitable for practicing the disclosed embodiments.

FIG. 1A shows a schematic diagram of an exemplary motor 10 suitable for practicing the embodiments disclosed herein. Although the presently disclosed embodiments will be described with reference to the drawings, it should be understood that they may be embodied in many alternate forms. It should also be understood that any suitable size, shape or type of elements or materials could be used.

Motor 10 includes an reactive element 11, in this embodiment in the form of a rotor, winding sets 12, 15, and a stator 14. The embodiment of exemplary motor 10 depicted in FIG. 1 is shown as having a rotary configuration, although other embodiments may include linear configurations as will be described below. Rotor 11 may have any suitable construction. The rotor 11 may have one or more magnetic sources mounted thereon, for example, permanent magnets, electromagnets or other types of magnetic sources. Winding sets 12, 15 may include one or more windings and may be driven by current amplifier 25 which may include software, hardware, or a combination of software and hardware suitable for driving the winding sets. The current amplifier 25 may also include a processor 27, a commutation function 30 and a current loop function 35 for driving the winding sets. The commutation function 30 may supply current for one or more windings of each winding set according to a set of specified functions, while the current loop function 35 may provide a feedback and driving capability for maintaining the current through the windings as supplied. The processor 27, commutation function 30, and current loop function 35 may also include circuitry for receiving feedback from one or more sensors or sensor systems that provide position information. Each current amplifier disclosed herein includes circuitry, hardware or software in any combination as required to perform the functions and computations for the disclosed embodiments.

Figure 1B:
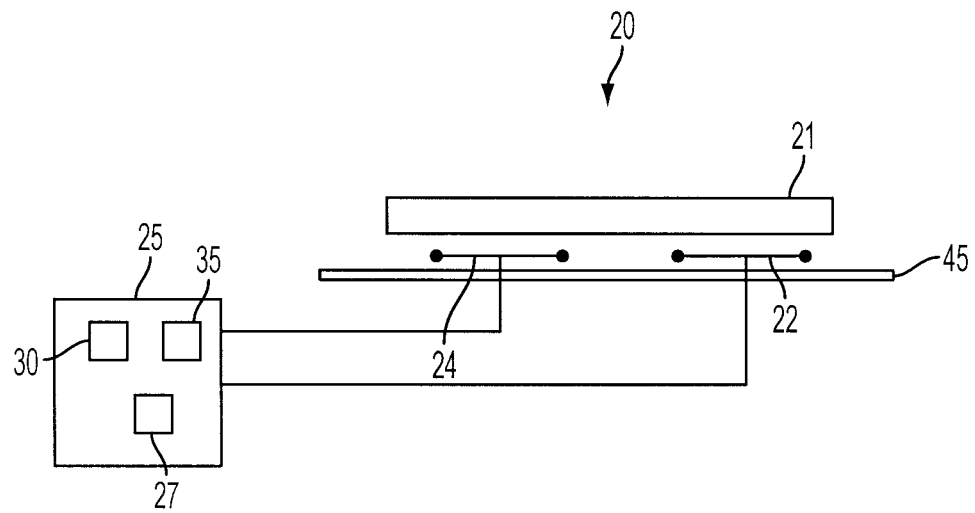

FIG. 1B shows another exemplary embodiment having a linear configuration. Motor 20 includes an reactive element 21, in this embodiment having the form of a platen, winding sets 22, 24 and a stator 45. Similar to the embodiment of FIG. 1, platen 21 may have one or more magnetic sources mounted thereon, for example, permanent magnets, electromagnets or other types of magnetic sources. Platen 21 may be constructed in any suitable manner and winding sets 22, 24 may include one or more windings.

Both motors 10, 20 may utilize a minimal air gap and ferromagnetic materials to affect a substantial gain in the magnetic flux density across the air gap which in turn produces desired axial and tilt stiffness. It would be advantageous to precisely measure the position of the reactive element of the motors 10, 20.

Figure 2:
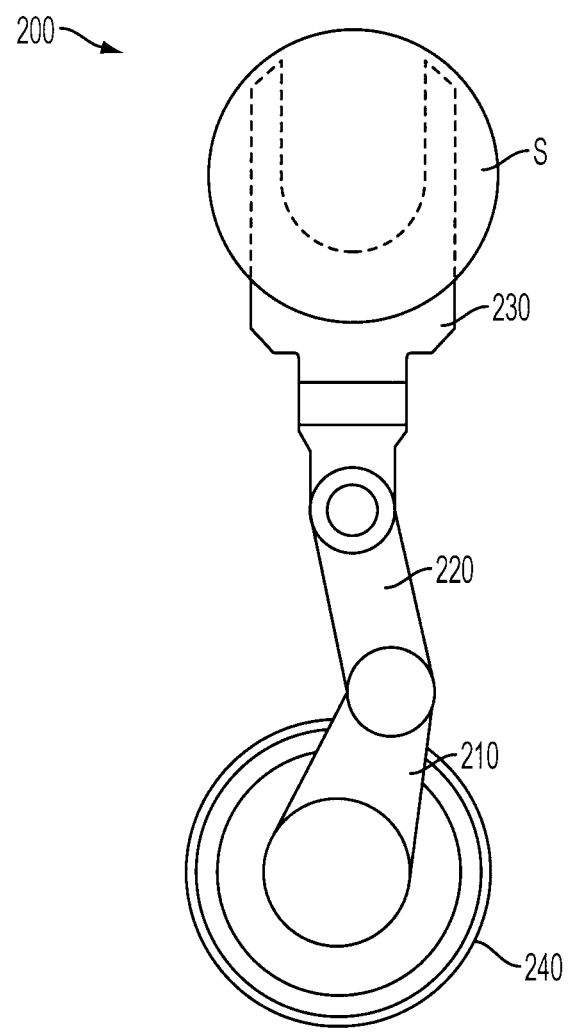
FIG. 2 shows an exemplary robot transport in which the exemplary embodiments may be utilized.

An exemplary robot transport 200 is shown in FIG. 2. The transport may include at least one arm having an upper arm 210, a forearm 220 and at least one end effector 230. The end effector may be rotatably coupled to the forearm and the forearm may be rotatably coupled to the upper arm. The upper arm may be rotatably coupled to, for example a drive section 240 of the transport apparatus which may include one or more of motors 10, 20 above.

Figure 3:
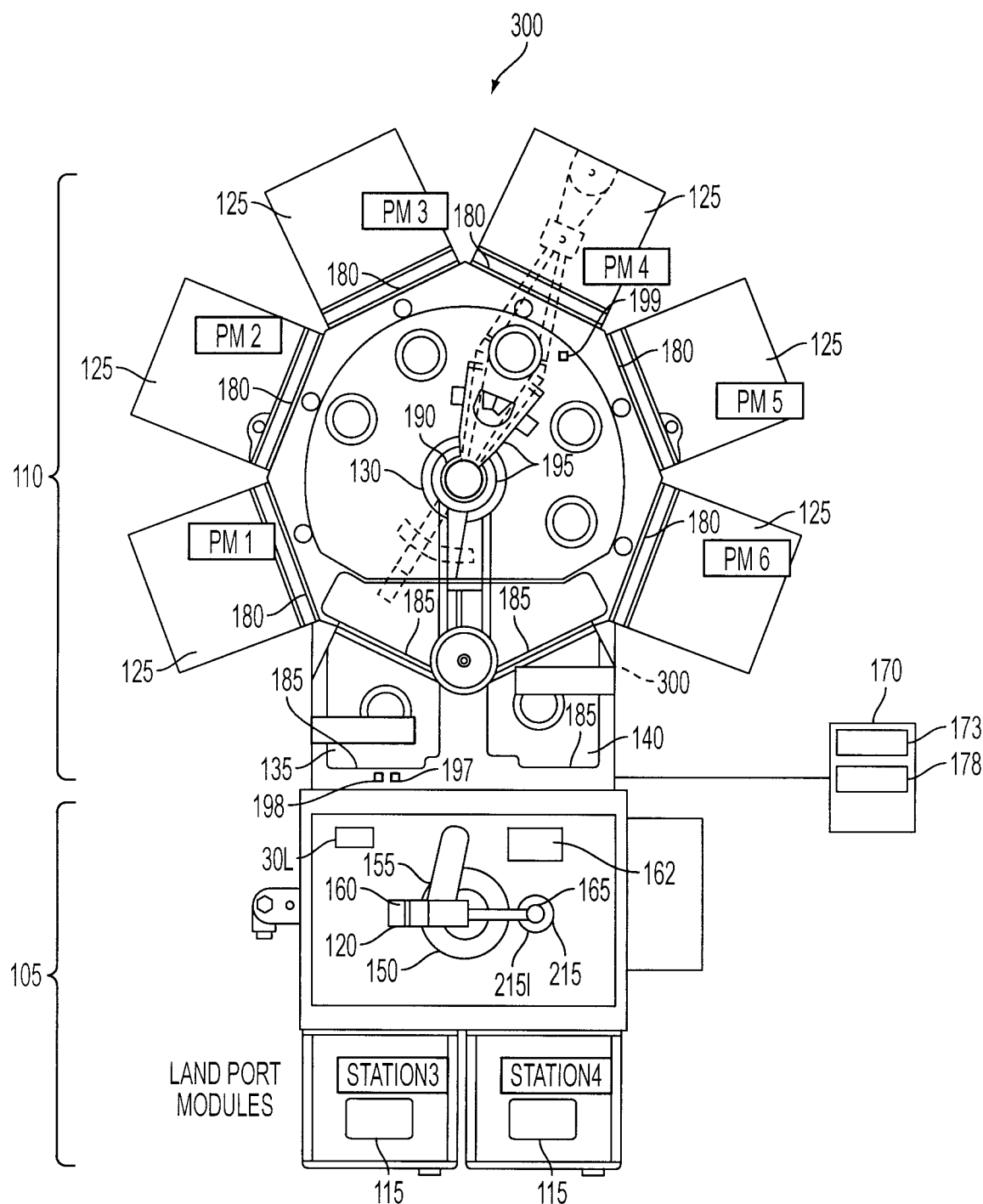
FIG. 3 shows an exemplary substrate processing apparatus in which the exemplary embodiments may be utilized.

An exemplary substrate processing apparatus 300 is shown in FIG. 3 incorporating features of the exemplary embodiments. In this example the processing apparatus 300 is shown as having a general batch processing tool configuration. In alternate embodiments the tool may have any desired arrangement, for example the tool may be configured to perform single step processing of substrates. In other alternate embodiments, the substrate apparatus may be of any desired type such as sorter, stocker, metrology tool, etc. The substrates 215 processed in the apparatus 100 may be any suitable substrate including, but not limited to, liquid crystal display panels, semiconductor wafers, such as a 200 mm, 300 mm, 450 mm wafers or any other desired diameter substrate, any other type of substrate suitable for processing by substrate processing apparatus 100, a blank substrate, or an article having characteristics similar to a substrate, such as certain dimensions or a particular mass.

In this embodiment, apparatus 300 may generally have a front section 105, for example forming a mini-environment and an adjoining atmospherically isolatable section 110, which for example may be equipped to function as a vacuum chamber. In alternate embodiments, the atmosphere isolated section may hold an inert gas (e.g. N2) or any other isolated and/or controlled atmosphere.

In the exemplary embodiment, front section 105 may generally have, for example one or more substrate holding cassettes 115, and a front end robot arm 120, similar to that shown in FIG. 2. The front section 105 may also, for example, have other stations or sections such as an aligner 162 or buffer located therein. Section 110 may have one or more processing modules 125, and a vacuum robot arm 130 which also may be similar to that shown in FIG. 2. The processing modules 125 may be of any type such as material deposition, etching, baking, polishing, ion implantation cleaning, etc.

As may be realized the position of each module, with respect to a desired reference frame, such as the robot reference frame, may be registered with controller 170. Also, one or more of the modules may process the substrate(s) 195 with the substrate in a desired orientation, established for example using a fiducial (not shown) on the substrate. Desired orientation for substrate(s) in processing modules may also be registered in the controller 170. Vacuum section 110 may also have one or more intermediate chambers, referred to as load locks.

The embodiment shown in FIG. 3 may have two load locks, load lock A 135, and load lock B 140. Load locks A and B operate as interfaces, allowing substrates to pass between front section 105 and vacuum section 110 without violating the integrity of any vacuum that may be present in vacuum section 110. Substrate processing apparatus 100 generally includes a controller 170 that controls the operation of substrate processing apparatus 100. Controller 170 has a processor and a memory 178. In addition to the information noted above, memory 178 may include programs including techniques for on-the-fly substrate eccentricity and misalignment detection and correction. Memory 178 may further include processing parameters, such as temperature and/or pressure of processing modules, and other portions or stations of sections 105, 110 of the apparatus, temporal information of the substrate(s) 215 being processed and metric information for the substrates, and program, such as algorithms, for applying this ephemeris data of apparatus and substrates to determine on the fly substrate eccentricity.

In exemplary apparatus 300, front end robot arm 120, also referred to as an ATM robot, may include a drive section 150 and one or more arms 155. At least one arm 155 may be mounted onto drive section 150 which may include one or more motors similar to those of FIGS. 1A and 1B above. At least one arm 155 may be coupled to a wrist 160, which in turn is coupled to one or more end effector(s) 165 for holding one or more substrate(s) 215. End effector(s) 165 may be rotatably coupled to wrist 160. ATM robot 120 may be adapted to transport substrates to any location within front section 105. For example, ATM robot 120 may transport substrates among substrate holding cassettes 115, load lock A 135, and load lock B 140. ATM robot 120 may also transport substrates 215 to and from the aligner 162. Drive section 150 may receive commands from controller 170 and, in response, direct radial, circumferential, elevational, compound, and other motions of ATM robot 120.

In the exemplary embodiment, vacuum robot arm 130 may be mounted in central chamber 175 of section 110. Controller 170 may operate to cycle openings 180, 185 and coordinate the operation of vacuum robot arm 130 for transporting substrates among processing modules 125, load lock A 135, and load lock B 140. Vacuum robot arm 130 may include a drive section 190 and one or more end effectors 195. In other embodiments, ATM robot 120 and vacuum robot arm 130 may be any suitable type of transport apparatus, for example, a SCARA-type robot, an articulating arm robot, a frog leg type apparatus, or a bi-symmetric transport apparatus.

Figure 4:
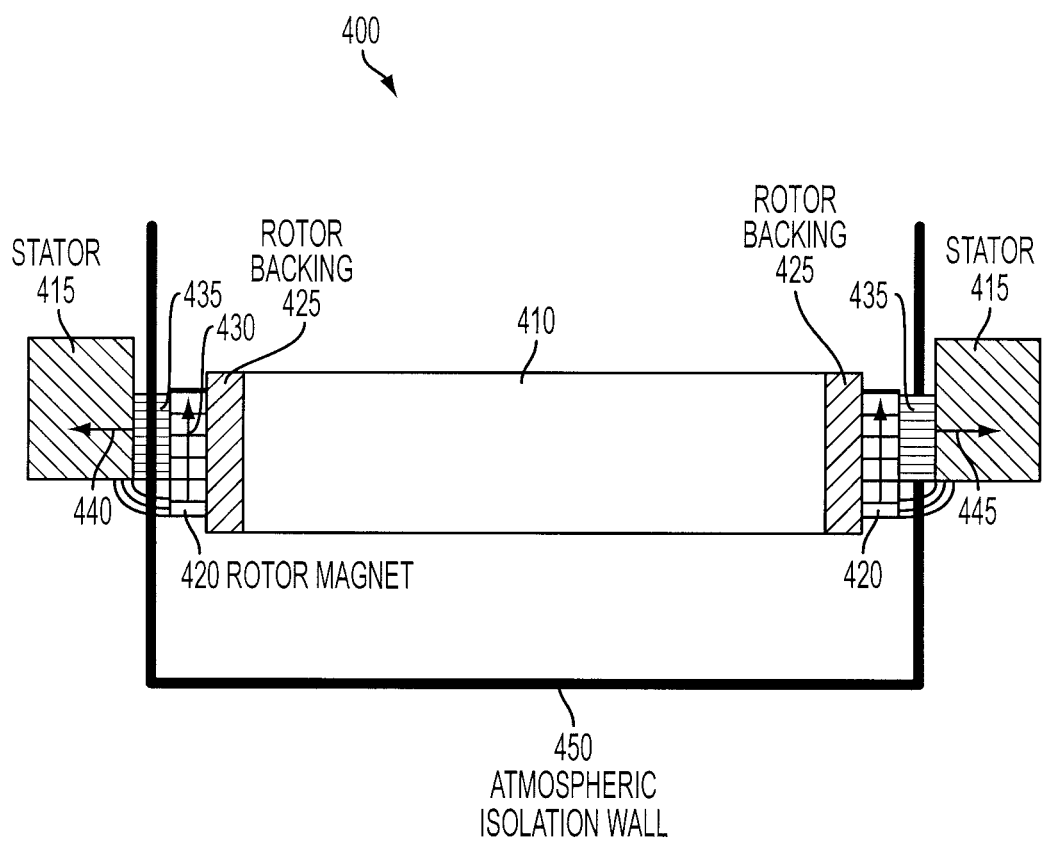
FIG. 4 shows a schematic diagram of a self bearing motor utilizing the exemplary embodiments.

Referring now to FIG. 4 a schematic diagram of a self bearing motor 400 is shown that may be employed in, for example, drive section 240 of transport robot 200. Self bearing motor 400 includes a rotor 410 and a stator 415. A single rotor/stator combination is shown in FIG. 4 for exemplary purposes only and it should be realized that the motor 400 may include any suitable number of rotors having any suitable configuration. In the exemplary embodiment of FIG. 4, the stator 415 may be substantially similar to, for example, the stator 14 of FIG. 1 described above. Correspondingly, the rotor 410 may also be substantially similar to rotor 11 of FIG. 1. Rotor 410 may be constructed of, for example, a ferromagnetic material and may include permanent magnets 420 and an iron backing 425.

In other alternate embodiments the permanent magnets may be replaced with any suitable ferromagnetic material for interacting with the stator, including other types of magnetic sources, for example, electromagnets. The rotor magnets 420 may include an array of magnets having alternating polarities mounted around a periphery of the rotor. The periphery of the rotor may be an internal peripheral wall or an external peripheral wall of the rotor. In alternate embodiments the magnets 420 may be embedded within the rotor. In other alternate embodiments, the magnets 420 may be located at any suitable location on or in the rotor 410.

The stator 415 may include windings sets which when energized drive the rotor rotationally, radially and/or axially. In this exemplary embodiment the stator 415 may be constructed of a ferromagnetic material but in alternate embodiments the stator may be constructed of any suitable material (in the case of non magnetic material stator, magnetic material may be included in the stator to provide for passive levitation. The interaction between the stator 415 and the rotor magnets 420 may produce passive forces in the direction of arrow 430 that passively levitate the rotor 410. Radial or attractive forces may be generated as a result of the magnetic flux lines 435 in the directions of for example, arrows 440, 445. These attractive forces may create an unstable condition such that the windings may be energized to actively center and/or position the rotor radially to maintain the geometric center of the rotor/axis of rotation at a desired location.

It should be noted that in the exemplary embodiment of FIG. 4 the rotor 410 is isolated from the stator 415 by a wall 450 that allows the rotor 410 to operate in a different environment from the stator 415, for example, a vacuum. Wall 450 may be constructed of a non-magnetic material thus allowing magnetic force to traverse the wall between the rotor 410 and stator 415.

Figure 5:
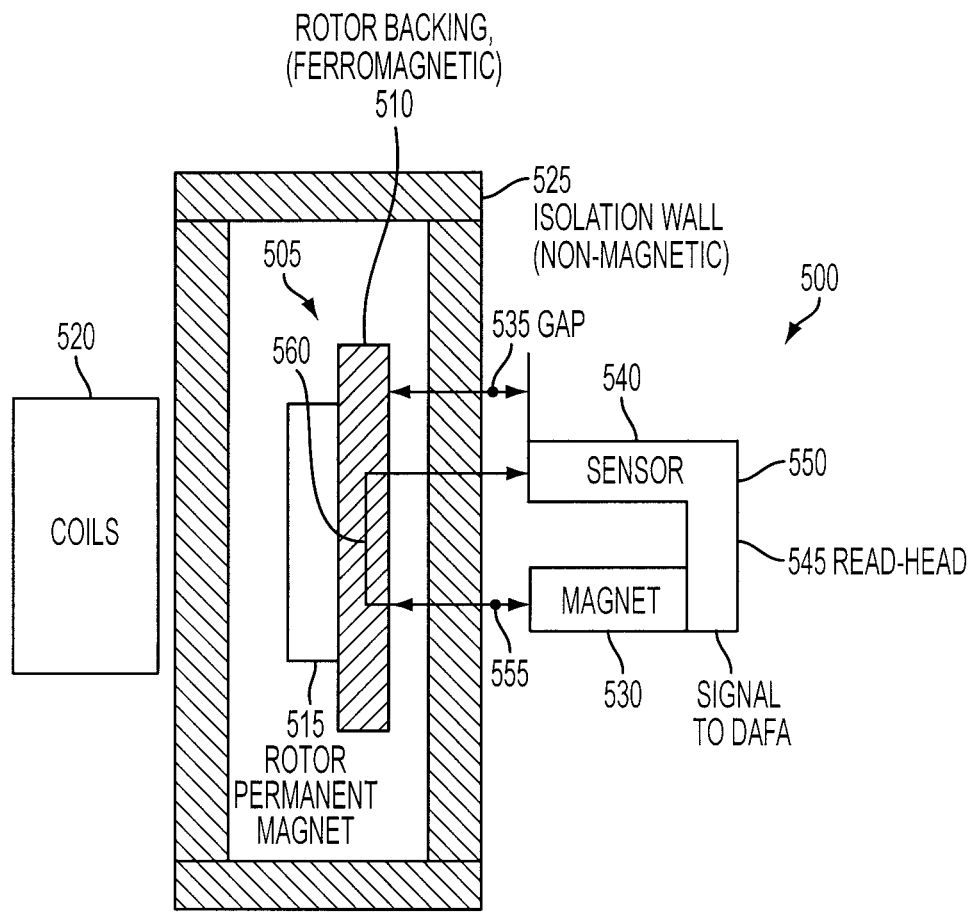
FIG. 5 shows an exemplary sensing mechanism according to the disclosed embodiments.

Turning now to FIG. 5, the principles of a sensing mechanism 500 according to the disclosed embodiments will now be explained. The embodiment of FIG. 5 shows a ferromagnetic target, for example a ferromagnetic backing 510. The ferromagnetic backing may be attached to a reactive motor element, for example, a rotor 505. The rotor 505 may have one or more permanent magnets 515. The rotor may be enclosed within a chamber 525 capable of supporting an environment different from that outside the chamber, for example a vacuum, high temperature, or corrosive atmosphere. The chamber 525 may be constructed of a nonmagnetic material. The rotor 505 may be driven by one or more coils 520 located outside the chamber 525.

The sensing mechanism 500 includes a read head 545 having a magnetic source 530 and a sensor 540 mounted on a sensor backing 550. In this embodiment, the sensing mechanism implements a magnetic circuit or flux loop path formed from the magnetic source 530, an air gap 555 between the magnetic source 530 and the ferromagnetic target, in this embodiment rotor backing 510, a path 560 through the rotor backing 510, a return path through the air gap 535 to the sensor 540, returning to the magnetic source 530 by way of the sensor backing 550. The magnetic flux loop path is continuously closed and the sensor 540 is capable of determining the magnetic flux intensity which is dependent on, among other factors, the distance between the magnetic source 530 and the rotor backing 510. In at least one embodiment, the sensor 540 has an output that uniquely correlates the magnetic flux intensity with the distance between the magnetic source and the ferromagnetic target. Magnetic source 530 may include one or more permanent magnets, electromagnets or any other suitable magnetic source. Sensor 540 may include one or more magnetic flux sensors, Hall effect, magneto resistive, or any other type of sensor suitable for sensing magnetic flux.

Figure 6:
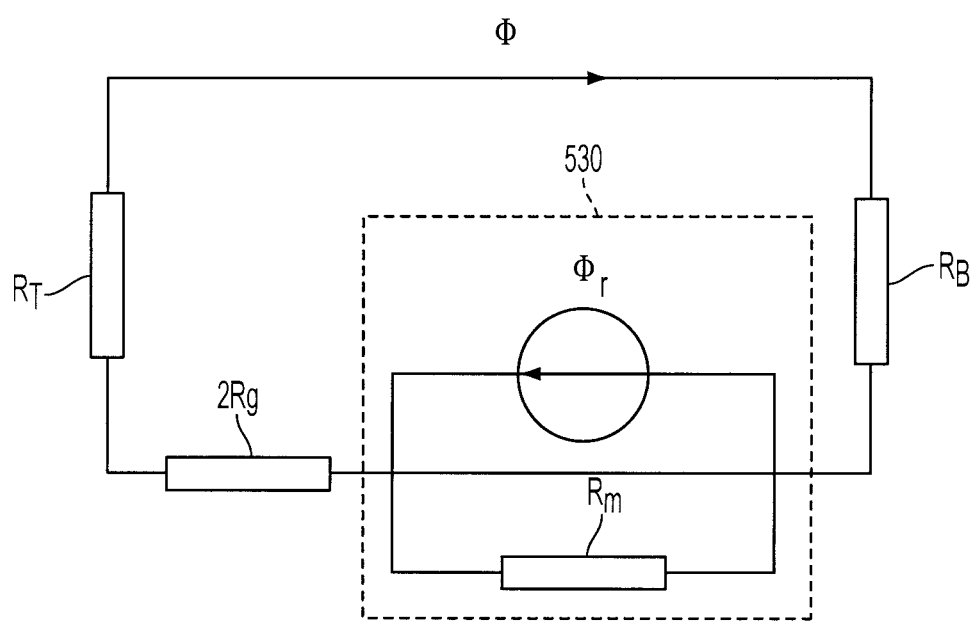
FIG. 6 shows a magnetic circuit equivalent of the sensing mechanism of FIG. 5.

FIG. 6 shows the magnetic circuit equivalent of the sensor mechanism of FIG. 5. The magnetic source 530 is represented by a constant flux source $\phi r$ and a magnetic source reluctance Rm in parallel. The intensity of the magnetic flux $\phi$ depends on the reluctance of the air gap 555 from the magnetic source 530 to the rotor backing 510 in combination with the air gap 535 from the rotor backing 510 to the sensor 540, represented as 2Rg, the magnetic source reluctance Rm, the reluctance of the rotor backing $R_T$ and reluctance of the sensor backing $R_B$. The magnetic source reluctance Rm, the reluctance of the rotor backing $R_T$ and reluctance of the sensor backing $R_B$ may be relatively constant. The air gap reluctance 2Rg is directly dependent on the distances between the magnetic source 530 and the rotor backing 510 and between the rotor backing 510 and the sensor 540, and thus may be uniquely correlated with those distances as they vary. Thus, the position of the rotor backing along distances 535, 555 may be determined without any invasion of the chamber 525 and no sensing devices within the chamber 525.

Still referring to the exemplary embodiment of FIG. 5, two scales may be defined on the rotor 505 in order to determine the rotor position to a desired level of resolution. The scales mat be positioned and constructed to cause variations in the magnetic flux intensity determined by sensor 540. The sensor output may then vary according a particular portion of the scale affecting the sensor, thus providing a position indicator. For example, a first scale may provide a high resolution incremental position with signal interpolation and a second scale may provide an absolute position of the rotor 505 within one cycle of the first incremental scale.

Figure 7:
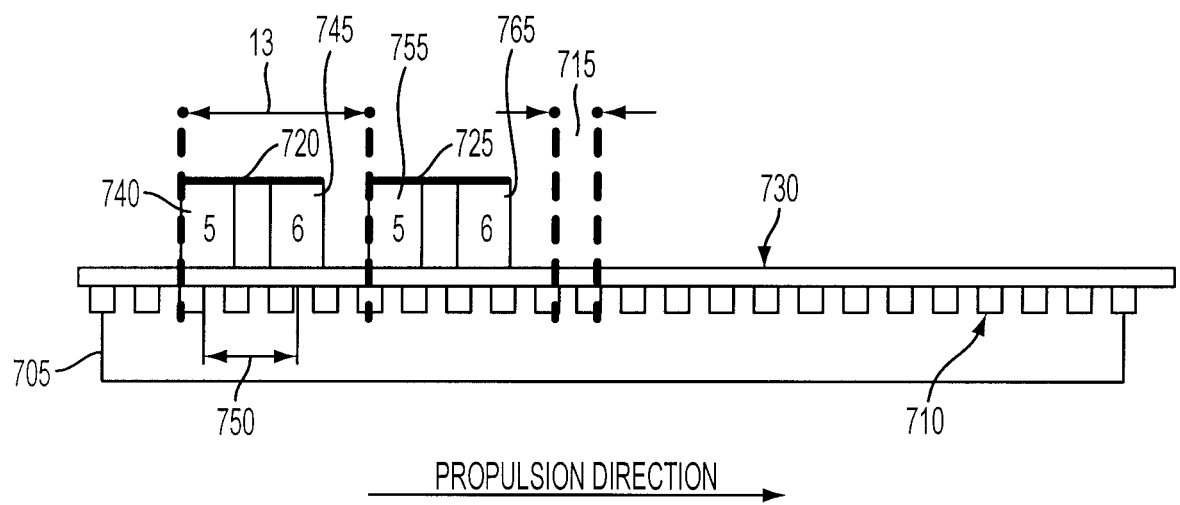
FIG. 7 shows an exemplary incremental scale.

An exemplary incremental scale 705 is depicted in FIG. 7. FIG. 7 shows sensor systems 720, 725 on one side of a wall 730 of a chamber, for example chamber 525 that interact with incremental scale 705. While shown in this example as a linear scale for simplicity, it should be understood that both the incremental and absolute scales discussed above may also have rotary configurations. Incremental scale 705 may include a profile 710 having a regularly spaced tooth pitch 715. Other regular patterns may be utilized on the incremental scale so long as they are suitable for indicating incremental positions along the scale. Incremental scale 705 may be machined from a suitable material and rigidly applied to rotor 505. In other embodiments scale 705 may be molded into, machined into, or otherwise made integral with rotor 505. The sensor systems 720, 725 each include a sensor 740, 755, respectively and a magnetic source 745, 765, respectively. Sensors 740, 755 may provide an analog or digital output. The sensor systems 720, 725 are positioned in this embodiment such that a sensor 740 and a magnetic source 745 of a sensor system, for example, sensor system 720, are at the same position relative to a pitch of the incremental scale 705. In other words, the center distance 750 between a corresponding sensor 740 and magnetic source 745 of the same sensor system 720 may be set approximately to an integer pitch number 715 of the incremental scale 705. Sensor systems 720, 725 may be located a fractional incremental scale pitch distance 13 from each other, such that their output may be for example, 90 degrees out of phase, due to different air gap reluctance along the sensor path.

In at least one embodiment sensors 740, 755 may provide sine/cosine-like analog signals as outputs. In some embodiments a combined output of sensors 740, 755 may include a quadrature count. As a result, an incremental position may be determined as the result of the quadrature count of the sine waves plus an interpolated position within a particular sine cycle. Actual resolution may depend on the number of bits of an analog to digital converter used to digitize the analog outputs as well as the noise level present in the outputs. While each sensor and magnetic source are oriented along a line parallel to the pitch of the scales, or of the pattern used to indicate incremental positions along the scales in FIG. 7, other orientations of the sensors and magnetic sources are also contemplated.

Figure 8:
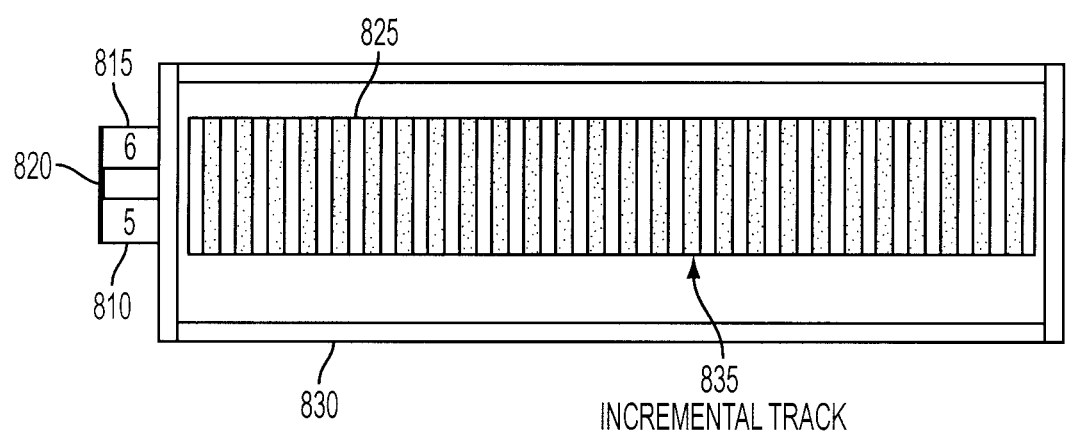
FIG. 8 shows another exemplary sensor system embodiment.

Another exemplary sensor system embodiment is shown in FIG. 8 which depicts a sensor system 820 and a rotor 825 having an incremental scale 835 positioned in a chamber 830. In FIG. 8, a magnetic source 810 and a sensor 815 of the sensor system 820 are oriented along a line perpendicular to the pitch of the pattern used to indicate incremental positions along the scale. Thus, both the sensor and source face the same portion of the pattern on the scale.

Figure 9:
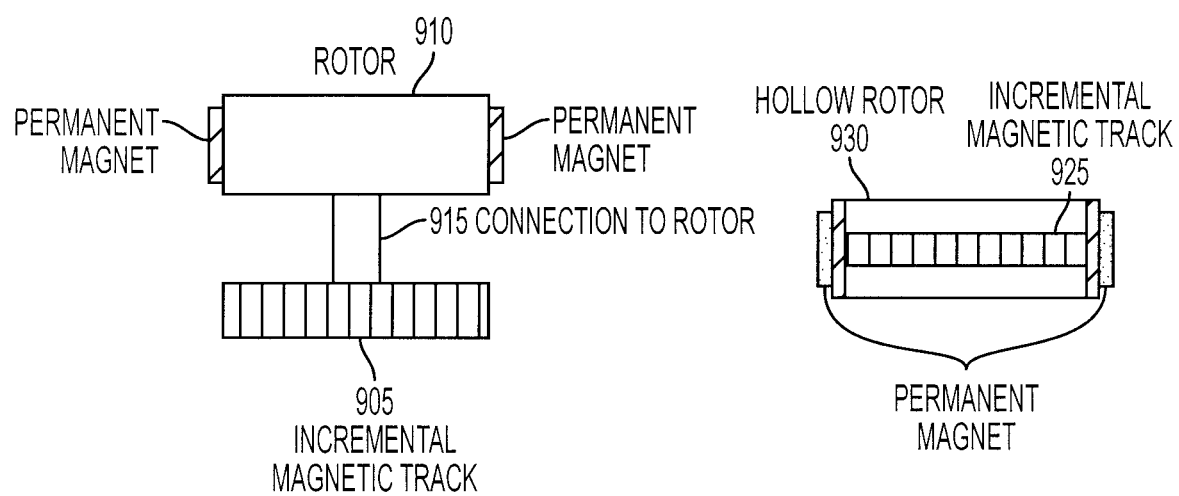
FIGS. 9A and 9B show additional incremental scale exemplary embodiments.

FIGS. 9A and 9B show exemplary embodiments with different incremental scale locations. In the embodiment of FIG. 9A the incremental scale 905 is set off from the rotor 910 and thus is independent from the rotor diameter. In some embodiments, incremental scale 905 may be directly coupled to rotor 910, for example, by a shaft or other device 915. In other embodiments, incremental scale 905 may be indirectly coupled to rotor 910 using any suitable indirect coupling device or method. In FIG. 9B the incremental scale 925 is integrated into an inner diameter of the rotor 930. It should be noted that the rotor magnets can be magnetically isolated from the incremental scale by properly sizing the rotor backing thickness and height.

As mentioned above, two scales may be defined on a rotor to measure positioning, an incremental scale and an absolute position scale. In at least one embodiment, the absolute position scale may include additional position information required to uniquely locate the rotor position. Absolute position encoders are generally able to provide a unique location without any referencing motion. Typically, such encoders may require several scales, where each scale may be read by an independent sensor system. The number of scales may dictate the number of bits of the absolute position encoder and consequently its resolution. In an embodiment using a digital absolute position scale, a digital absolute position may be read by a number of independent sensors each facing its respective scale. Each sensor may provide the state of one respective bit of a word that defines a digital position. A classical example of a pattern 1005, referred to as a Gray code with 5 bits is shown in FIG. 10. Each row of the pattern 1005 includes a 5 bit word that indicates an absolute position, in this embodiment expressed as an angular position in degrees. S4 represents the most significant bit of each 5 bit word and each word differs from the next one by only one single bit, typical of a Gray code sequence.

An absolute position may be obtained by utilizing a single digital scale attached to a rotor. In order to read an absolute digital position, a set of sensors may be placed facing the absolute track at a certain interval relative to each other. The number of sensors may determine the number of bits for the absolute position. The use of a single scale design is advantageous since it allows for a smaller footprint of the design. The bit pattern sequence of the single scale may also have the form of a Gray code, that is, where only one bit changes at a time.

Figure 11:
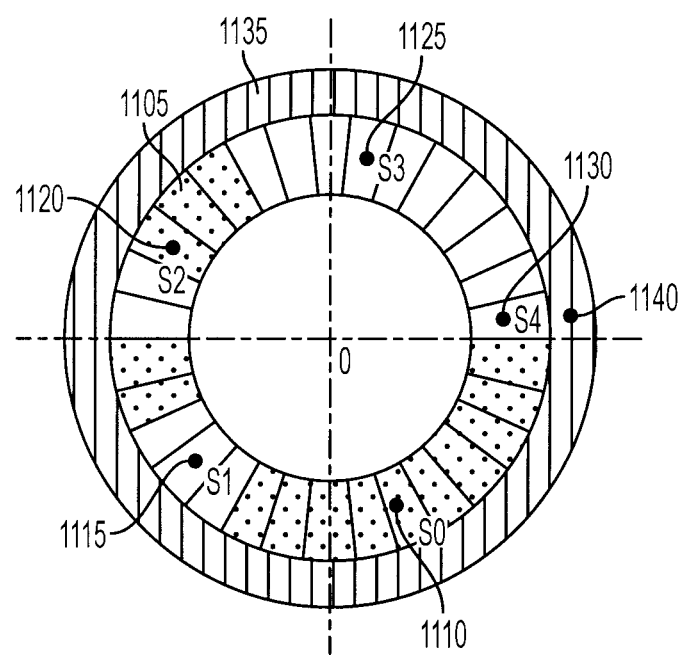
FIG. 11 shows an example of a single scale for indicating absolute position.

FIG. 11 shows an example of a single scale 1105 for indicating absolute position. The single scale 1105 has a pattern that mimics the pattern shown for S4 in FIG. 10. By locating five sensors S0 1110, S1 1115, S2 1120, S3 1125, S4 1130 around the scale 1105 in specific locations, the sensors generate the sequence of FIG. 10 as the pattern rotates, thus generating absolute position indications for an attached rotor. It is important to understand that a scale may be constructed that utilizes any number of bits suitable for providing a desired positional resolution. The single absolute scale may be utilized in combination with an incremental scale, for example 1135 in FIG. 11 and an incremental scale sensor 1140.

In another embodiment, the single absolute scale 1105 of FIG. 11 may be used alone to simultaneously generate a digital absolute position and an interpolated incremental position within the resolution of the digital absolute position. As mentioned above, the magnetic sensors may be capable of providing digital or analog outputs. In embodiments where the magnetic sensors are capable of providing analog outputs a digital output pattern of an absolute position scale may be generated from the analog output signals by setting thresholds for determining when a bit of the pattern changes. At the same time the analog value of the changing signal may be measured and the changing analog values may be utilized to determine a position with additional resolution than that provided by the single absolute scale. For example, a digital signal processor may be utilized to measure the outputs of the sensors, sensing both the digital output of the sensors according to the set thresholds as well as the instantaneous analog output of the sensor that is undergoing a single bit change. This instantaneous analog output may be used to generate the interpolated position between the current digital absolute position and the next one.

Figure 12:
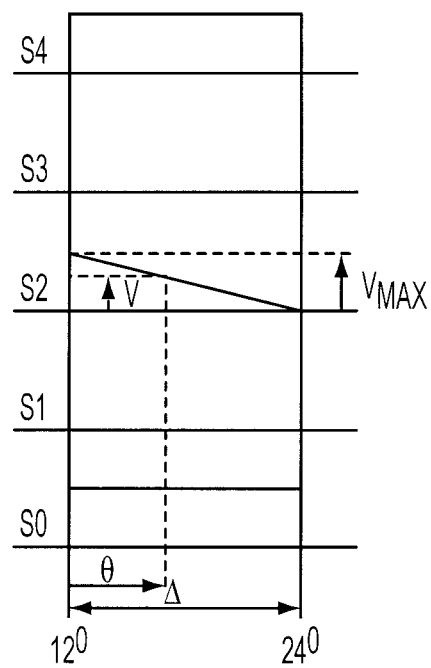
FIG. 12 illustrates an exemplary sensor output change.

FIG. 12 illustrates an exemplary change of output by sensor S2 of FIGS. 10 and 11 where the rotor is transitioning between 12 and 24 degrees as shown in FIG. 10. In FIG. 12, the interpolated position is represented by the angle θ and the analog sensor output is represented by the parameter V. Since this is a Gray code scale, only sensor S2 is changing its state (from high to low in this case). The interpolated position θ can be determined from the output V as:

$$\theta = \frac{V_{max} - V}{V_{max}} \Delta$$

Therefore, the total absolute position for rotor given the position indications of FIG. 12 is:

$$\theta_{ABS} = 12° + \theta$$

The resolution of the interpolated position θ depends on the available resolution of the conversion function, for example, an A/D converter, used to sample the signal V. One representation for the total number of bits for expressing the absolute position may be the sum of the number of sensors plus the number of bits of the AD converter:

$$N_{ABS} = N_{Sensors} + N_{AD}$$

For example, for the sequence shown in FIG. 10 using the sensors of FIG. 11 and a 12 bit AD converter, the total number of bits for expressing the absolute position would be 17, thus yielding a significant improvement in resolution over using the five bit Gray code sequence of FIG. 10 alone.

Figure 13:
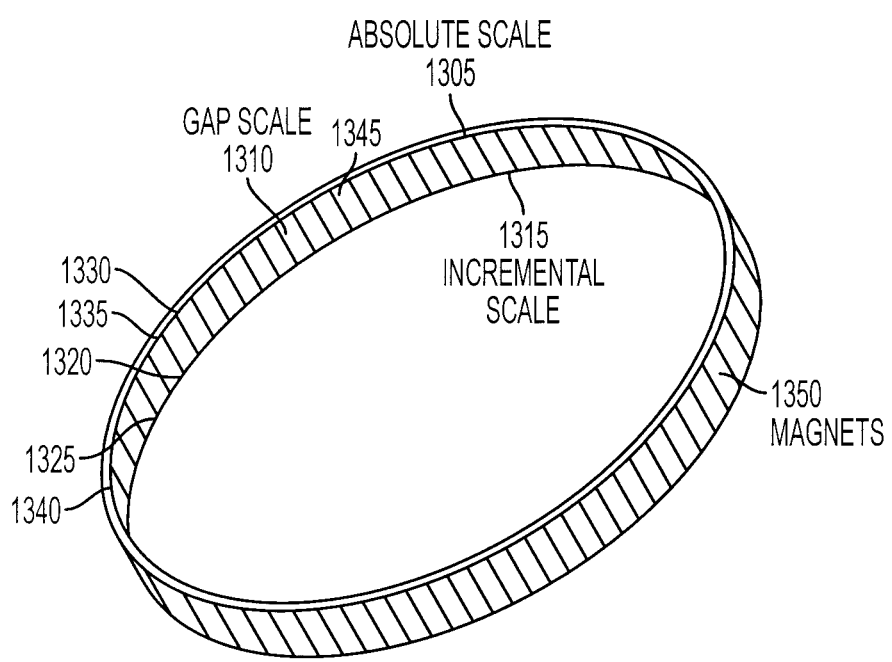
FIG. 13 shows an exemplary embodiment with multiple scales located on the same diameter.

FIG. 13 shows an exemplary embodiment with multiple scales located on the same diameter. In this embodiment, an absolute scale 1305, a gap scale 1310 and an incremental scale 1315 are axially offset from each other. In at least one embodiment the gap scale may be eliminated by recognizing the upper surfaces 1320 or lower surfaces 1325 of the incremental scale as appropriate as the gap surface and measuring the gap at that point using the reluctance measuring techniques described herein. In another embodiment, the upper 1330 or lower 1335 surfaces of the absolute scale 1305 may also be used to measure the gap using the techniques described above, eliminating the need for a separate gap scale. In this embodiment, the scales are located on an inner surface of a rotor 1345 having a number of magnets 1350. A backing 1340 operates to insulate magnetic sensor systems associated with the scales from the effects of the rotor magnets 1350.

Figure 14:
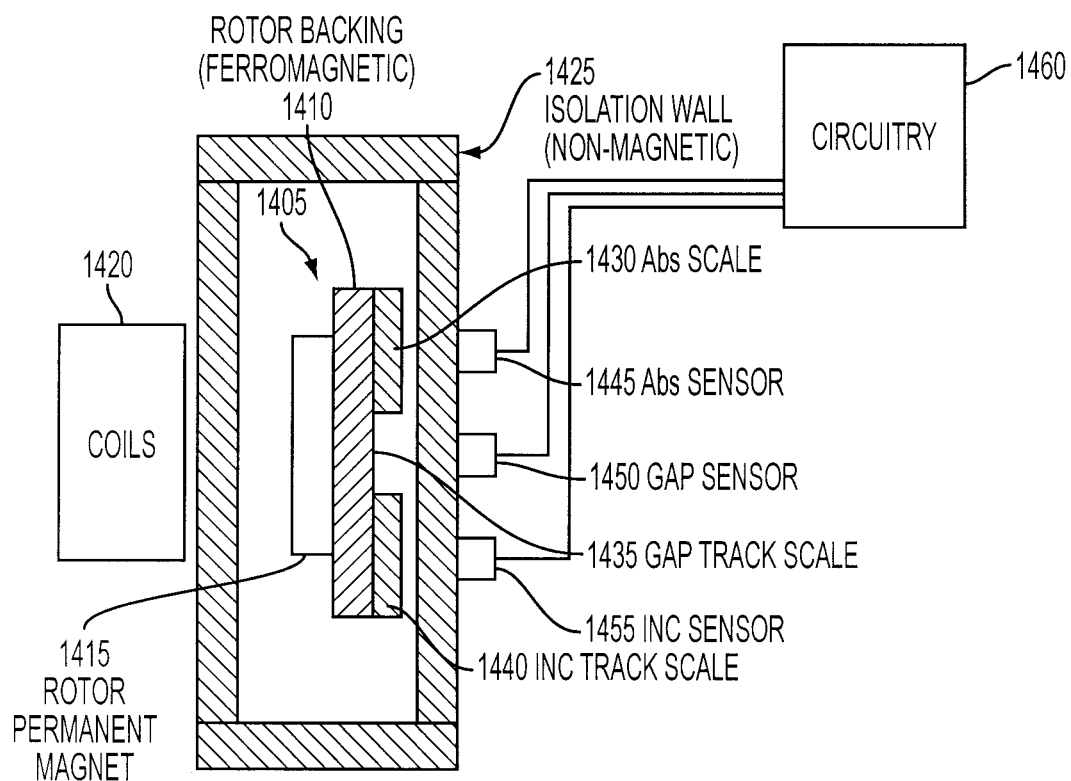
FIG. 14 shows a multiple sensor system.

FIG. 14 shows a multiple sensor system that may utilize an arrangement of multiple scales, for example as shown in FIG. 13. FIG. 14 shows a rotor 1405 with a ferromagnetic backing 1410, and one or more permanent magnets 1415. The rotor may be enclosed within a chamber 1425 capable of supporting an environment different from that outside the chamber, for example a vacuum, high temperature, or corrosive atmosphere. The chamber 1425 may be constructed of a nonmagnetic material. The rotor 1405 may be driven by one or more coils 1420 located outside the chamber 1425.

In this embodiment, three scales are attached or integral to rotor 1405, an absolute scale 1430, a gap scale 1435, and an incremental scale 1440. One or more sensor systems may be associated with each scale. This embodiment includes an absolute sensor system 1445 for reading the absolute scale 1430, a gap sensor system 1450 for reading the gap scale 1435, and an incremental sensor system 1455 for reading the incremental scale 1440. Each of the sensor systems 1445, 1450, 1455 may include any number of sources and sensors as described above. As mentioned above, the gap scale 1435 may be combined or superimposed upon any of the other scales. When combined or superimposed, the gap scale may continue to be read using the gap sensor system 1450 or may be read by the sensor system for the scale with which it is combined or superimposed. It should be understood that while this embodiment shows three scales and three sensor systems, that any suitable number of scales and sensor systems may be utilized.

In this embodiment, the multiple sensor system also may include circuitry 1460 coupled to the absolute, incremental, and gap sensor systems. The circuitry may provide an output indicative of a measured position of the reactive motor element from a combination of outputs of the absolute, incremental, and gap sensor systems.

Figure 15:
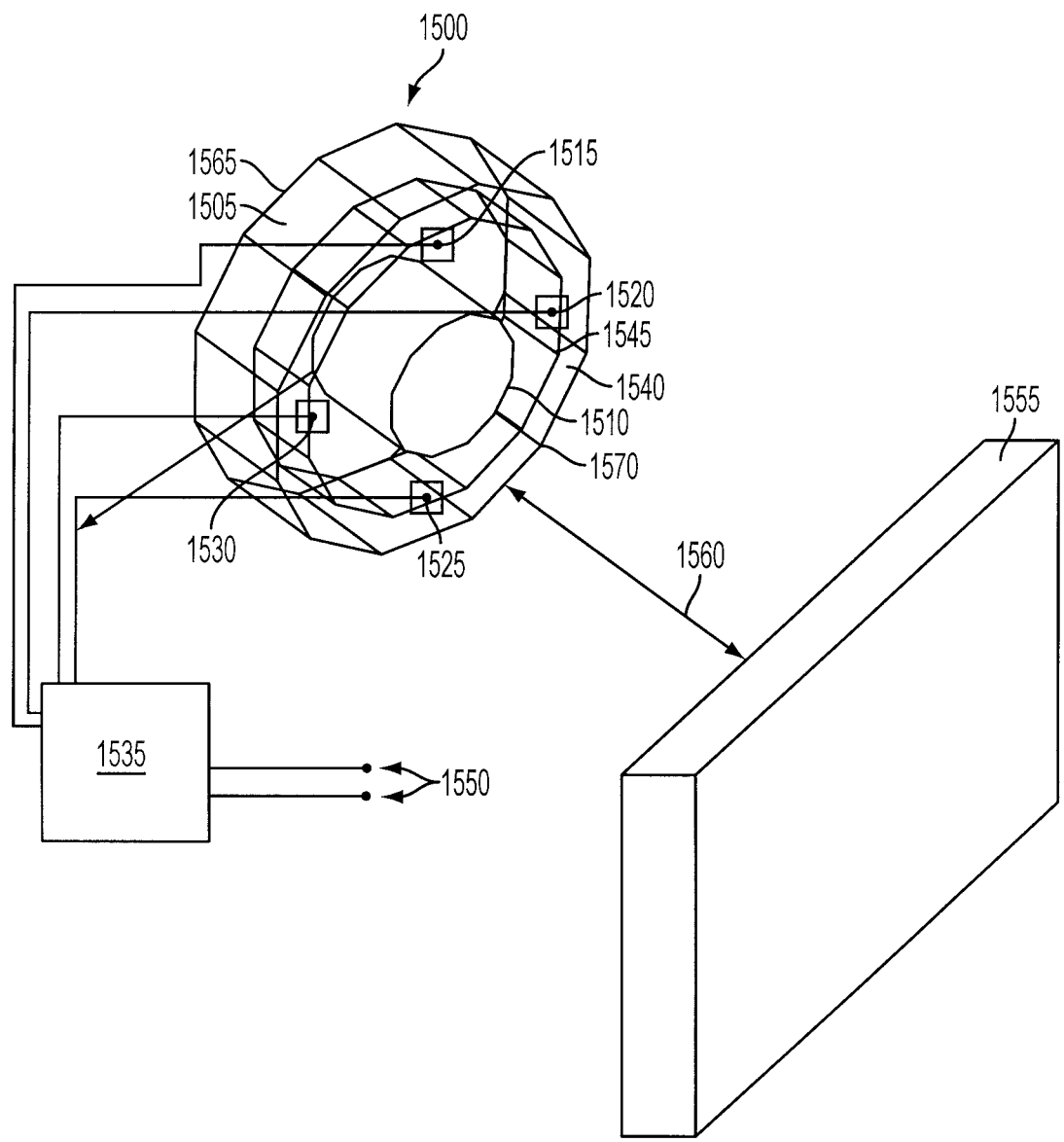
FIG. 15 shows another exemplary sensor system suitable for use with the embodiments described.

FIG. 15 shows an exemplary sensor system 1500 suitable for use with the embodiments described herein. Sensor system 1500 may utilize magnetic circuit principles, for example, similar to those described above to determine a distance from a ferromagnetic target 1555, for example, a rotor backing to the sensor system's reference frame. The ferromagnetic target 1555 may be a flat or curved surface or have any machined profile attached to, embedded in, or otherwise integral to the target, for example, the scales discussed above. The sensor system 1500 may include a ferromagnetic element 1505, a magnetic source 1510, for example, a permanent magnet, a number of magnetic sensors 1515, 1520, 1525, 1530 and conditioning circuitry 1535. The ferromagnetic element 1505 may circumscribe the magnetic source 1510. In other embodiments, the ferromagnetic element 1505 may surround or even enclose the magnetic source 1510. In at least one exemplary embodiment, the ferromagnetic element 1505 may have a cup shape with a closed end 1565 and an open end 1570. The magnetic source 1510 may have a cylindrical shape where the direction of magnetization is parallel to the axis of symmetry of the ferromagnetic element 1505. The magnetic source 1510 may be a permanent magnet, an electromagnet, or any other suitable source of magnetic energy. The magnetic source 1510 may be attached within the ferromagnetic element to the center of the ferromagnetic element 1505 by attractive forces and may be held in place using a suitable fastener, for example an adhesive. In at least one embodiment, the sensor system 1500 may be oriented such that the open face 1570 of the cup faces the ferromagnetic target 1555.

The embodiment shown in FIG. 15 establishes a magnetic circuit between the ferromagnetic element 1505 and the magnetic source 1510 such that the flux density is symmetric about the axis of the cup or any concentric perimeter between the magnetic source 1510 and the ferromagnetic element 1505. The shape of the ferromagnetic element 1505 influences the shape of the magnetic field. In embodiments where the ferromagnetic element 1505 is cup shaped, the magnetic field is relatively confined, resulting in an increased sensitivity to variations in the distance 1560 to the ferromagnetic target. The ferromagnetic element 1505 may have a shape tailored to create a specifically shaped magnetic field. In some embodiments the ferromagnetic element 1505 may also be fashioned to provide a specific sensitivity to distance variations between the sensor system 1500 and the ferromagnetic target 1555.

Magnetic sensors 1515, 1520, 1525, 1530 may operate to sense the flux density and may be located in an orbital configuration at a constant radial distance from the axis of symmetry of the ferromagnetic element 1505. The magnetic sensors may also be positioned such that their outputs are approximately the same. While four magnetic sensors are shown, it should be understood that any suitable number of magnetic sensors may be utilized. Outputs of the magnetic sensors 1515, 1520, 1525, 1530 may be provided to the conditioning circuitry 1535. Conditioning circuitry 1535 may include signal processing circuitry for processing the sensor outputs, for example, to provide compensation, filtering, noise reduction, or any other suitable signal processing. The sensor output signals may generally be processed to provide a sensor system output 1550. The use of additional sensors may improve the noise immunity of the system. The ferromagnetic element 1505 may also operate as a magnetic isolation cage for the magnetic sensors minimizing external magnetic interference from the surrounding environment. The sensor system 1500 is thus configured to measure alterations in the magnetic flux density vector detected by the magnetic sensors. In particular, the sensor system 1500 may measure alterations in the magnetic flux density vector due to the presence of the ferromagnetic target 1555. In at least one embodiment, outputs of the magnetic sensors 1515, 1520, 1525, 1530 may be conditioned to provide a sensor system output 1550 indicating the distance 1560 to the ferromagnetic target 1555.

Figure 16:
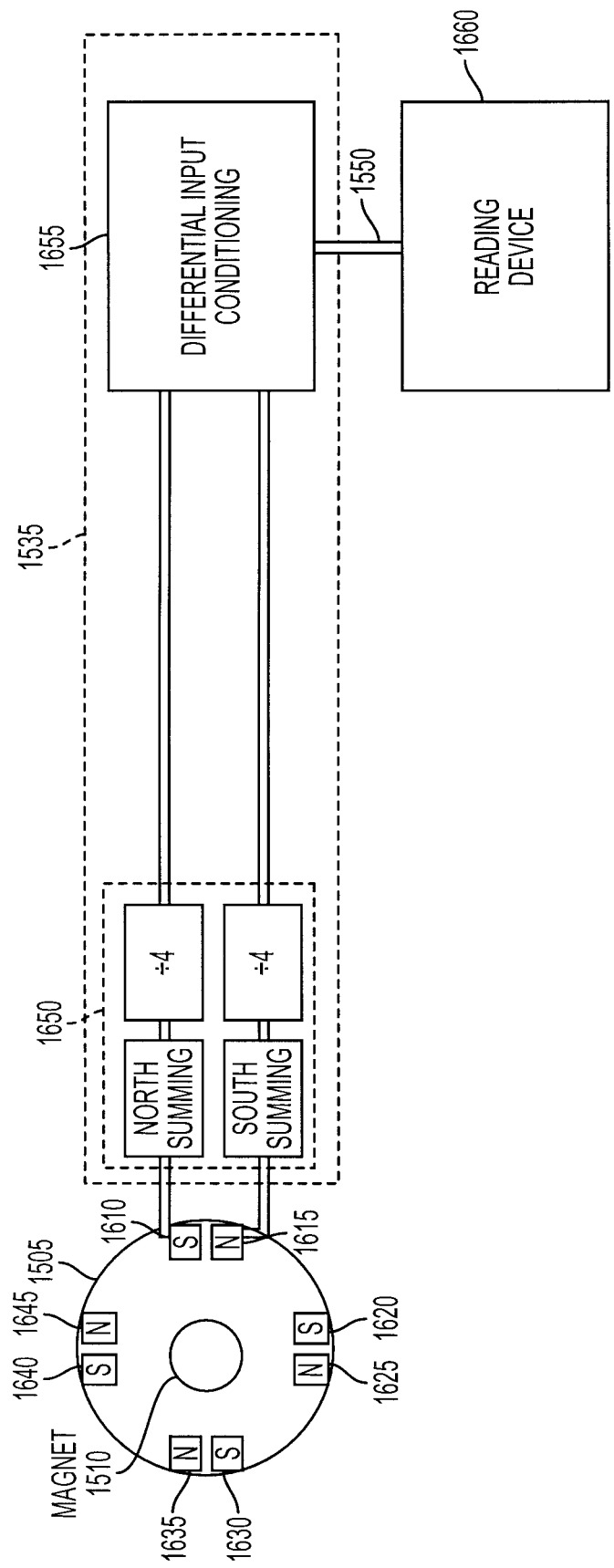
FIG. 16 shows an exemplary arrangement of magnetic sensors around a ferromagnetic element.

FIG. 16 shows an exemplary arrangement of magnetic sensors around the ferromagnetic element. In this embodiment magnetic sensors may be arranged in pairs 1610 1615, 1620 1625, 1630 1635, 1640 1645 with alternating orientations relative to the flux density lines between the ferromagnetic element 1505 and the magnetic source 1510. In this embodiment, each sensor pair may provide a differential output. Summing 1650 and differential conditioning 1655 circuitry may be part of conditioning circuitry 1535 and may further provide sensor system output 1550 as a differential signal. The use of differential outputs may improve noise immunity, in particular where signals have low levels, are subject to a hostile electrical electromagnetic environment, or travel any appreciable distance. For example, providing sensor system output 1550 as a differential signal may improve noise immunity as the output is provided to reading device 1660.

In other embodiments, the magnetic sensors do not have to be placed at equal radial distance from the axis of symmetry and that their outputs need not be necessarily equal and yet the outputs can be suitably processed to yield the effective target distance. It should be understood that any number of magnetic sensors may be used, either ungrouped, or grouped together in any suitable number or arrangement.

In addition to measuring target distance, the sensing system 1500 may also be used interchangeably with sensing systems 720 or 725 or 820 in FIGS. 7 and 8, to read incremental or absolute position tracks.

Returning to FIG. 15, the ferromagnetic target 1555, once located in front of the sensor system 1500 alters the magnetic flux density vector detected by magnetic sensors 1515, 1520, 1525, 1530, thus affecting output signal 1550. The distance 1560 between the target 1555 and the sensor system may determine the value of sensor system output 1550. The sensor system output 1550 may vary according to any magnetic flux variations introduced by one or more scales that may be attached to or integral with ferromagnetic target 1555.

The shape of the magnetic source 1510 and the ferromagnetic element 1505 may be modified to obtain a particular flux density pattern or configuration, or to optimize or otherwise improve the sensor system output 1550 or the distance 1560. For example, in some embodiments, at least one of the ferromagnetic element 1505 and the magnetic source 1510 may have the shape of a cylinder, cone, cube or other polyhedron, paraboloid, or any other suitable shape. As mentioned above, any number of sensors may be utilized. Furthermore, the sensors may have any suitable arrangement for obtaining a particular flux density pattern, or for optimizing the sensor system output 1550 or the distance 1560.

The sensor system 1500 is suitable for use in the embodiments described herein, for example, through a wall of non-magnetic material as used in the chambers disclosed herein that may isolate a target rotor or scale from the sensor system. The sensor system 1500 is suitable for use in vacuum automation system embodiments. The sensor system 1500 is particularly suited for measuring magnetic flux, gaps and scales for all the embodiments described herein.

Figure 17:
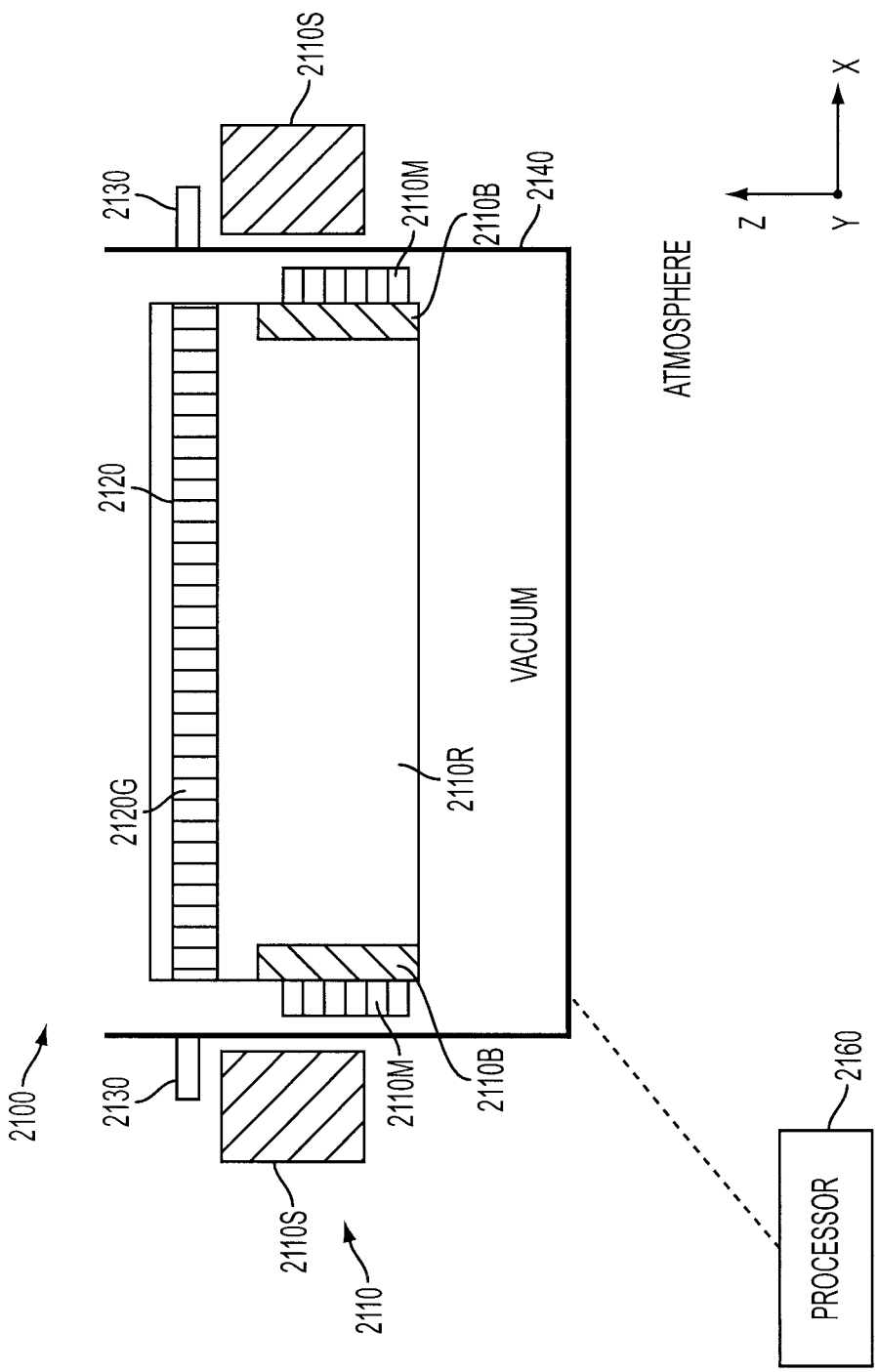
FIG. 17 illustrates a portion of a drive section incorporating aspects of an exemplary embodiment.

FIG. 17 illustrates an exemplary motor 2110 including a position feedback system 2100 in accordance with an exemplary embodiment. Although the embodiments disclosed will be described with reference to the embodiments shown in the drawings, it should be understood that the embodiments disclosed can be embodied in many alternate forms of embodiments. In addition, any suitable size, shape or type of elements or materials could be used.

The feedback system of the exemplary embodiments may provide high resolution positional feedback for any suitable motor. The feedback system of the exemplary embodiments may allow for the simultaneous measurements of eccentricity and orientation (e.g. rotation) with respect to a stator of the motor based on tangential positional measurements.

The motor 2110 shown in FIG. 17 includes a single rotor/stator for exemplary purposes only and it should be realized that the motor 2110 may include any suitable number of rotors arranged in any suitable configuration including, but not limited to, coaxial and non-coaxial configurations. In the exemplary embodiment of FIG. 17, the stator 2110S may be, for example, an iron-core stator but in alternate embodiments the stator may be any suitable stator. The rotor 2110R may be, for example, constructed of any suitable material and include permanent magnets 2110M and iron backings 2110B. In alternate embodiments, the rotor may include any ferromagnetic material for interacting with the stator 2110S.

The stator 2110S may include any suitable winding sets for controlling the position of the rotor 2110R in, for example, the X-Y plane and/or in the Z-direction. In alternate embodiments the winding sets may have any suitable configuration. The interaction between the stator 2110S and the rotor magnets 2110M may produce forces that passively levitate the rotor 2110R. The levitation force may be a result of curved magnetic flux lines which in turn may be generated by, for example, an offset of an edge of the rotor magnet relative to the an edge of the stator as described in U.S. Provisional Patent application 60/946,687, entitled "ROBOT DRIVE WITH MAGNETIC SPINDLE BEARINGS", filed 27 Jun. 2007, the disclosure of which is incorporated by reference herein in its entirety. In alternate embodiments the levitational forces may be generated in any suitable manner.

The feedback system 2100 of the exemplary embodiment includes multiple read heads 2130 and a scale 2120. The read heads 2130 may be any suitable read heads including, but not limited to non-contact optical, capacitive, inductive and magnetic read heads. In alternate embodiments the read heads may be contact based read heads. The read heads may be located at any suitable location in the motor such that the read heads 2130 are fixed with respect to the stator 2110S. In alternate embodiments the read heads 2130 may have any suitable relationship with respect to the stator 2110S. As may be realized in alternate embodiments the read heads 2130 may be positioned, configured and/or suitably isolated from the rotor 2110R and stator 2110S such that, for example, magnetic interaction between the read heads 2130 and the rotor 2110R and stator 2110S does not alter the readings provided by the read heads 2130.

The read heads 2130 may be communicably coupled to any suitable processor 2160 configured to receive output signals from the read heads 2130 and process those signals as will be described below to determine the positional data with respect to the rotor 2110R. For exemplary purposes only, the read heads 2130 may be in communication with the processor 2160 through any suitable wired or wireless connections including, but not limited to, wide area networks, local area networks, Bluetooth, infrared, radio frequency or any other suitable connections. In one or more embodiments, the read heads 2130 may include one or more sensing mechanisms 500 or sensor systems 1500 described above.

The scale 2120 may be any suitable scale including, but not limited to, absolute or incremental scales configured for use with the read heads described above. It is noted that while one scale is shown in the Figures that in alternate embodiments any suitable number of scales may be used. As a non-limiting example, in one alternate embodiment, each read head 2130 may have its own respective scale while in other alternate embodiments some read heads may share one scale while other read heads share a different scale.

In one exemplary embodiment, the scale 2120 may be bonded to or otherwise attached to the rotor 2110R. In other exemplary embodiments the scale 2120 may be embedded in the rotor 2110R such as by, machining, etching or any other suitable manufacturing technique. In alternate embodiments the scale 2120 may be a disk attached to and extending radially from the rotor. In other alternate embodiments the scale may have any suitable configuration. The scale 2120 may be configured such that the graduations 2120G on the scale are arranged so the read heads can effect the detection of eccentricity and/or rotation of the rotor 110R as will be described in greater detail below. In alternate embodiments the graduations on the scale may be arranged in any suitable manner.

Still referring to FIG. 17, it is further noted that the feedback system 2100 of the exemplary embodiments may be utilized in any suitable environment including, but not limited to, vacuum, atmospheric or controlled air environments. In one exemplary embodiment, the motor may include a boundary 2140 that may allow the rotor 2110R to operate in a vacuum while the stator 2110S operates in an atmospheric environment. In alternate embodiments each of the stator and rotor may operate in any suitable environment that may be the same or different from each other. The boundary 2140 may be constructed of any suitable material for use in, for example, a vacuum environment and from material that can be interposed within magnetic fields without causing a flux short circuit or being susceptible to eddy currents and heating from magnetic interaction. The boundary may also be coupled to suitable heat transfer devices (e.g. passive or active) to minimize temperatures in the drive section. In one exemplary embodiment where the read heads 2130 are optical read heads 2130 the boundary may include optical view ports to allow the read heads 2130 to read the scale 2120. Where the read heads 2130 are capacitive, inductive or magnetic (e.g. Hall sensors) there may not be any view ports associated with the read heads 2130.

Figure 18:
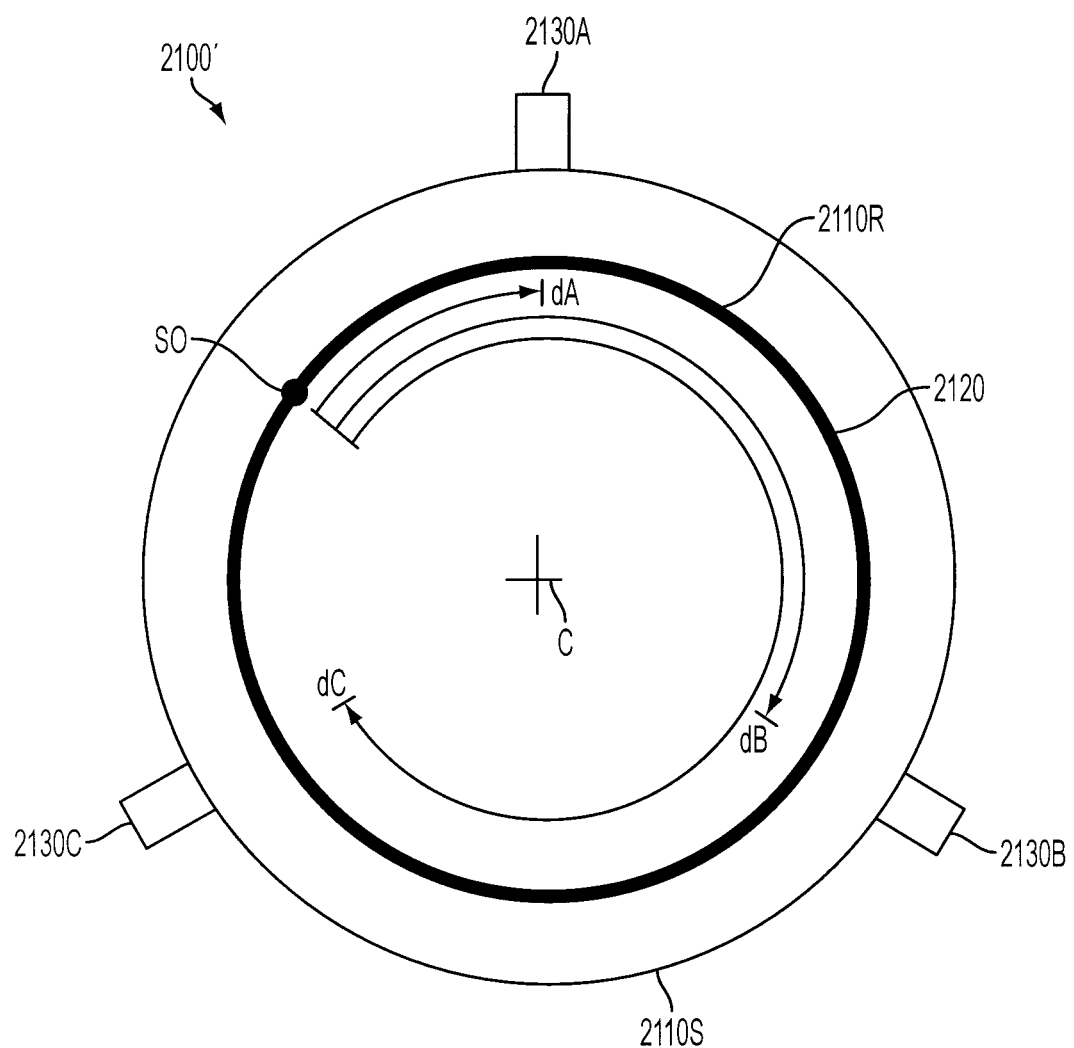
FIG. 18 is a schematic illustration of a feedback system in accordance with an exemplary embodiment.

Referring now to FIG. 18, a schematic view of the feedback system 2100' is shown in accordance with an exemplary embodiment. In the exemplary embodiment shown in FIG. 18, the feedback system 2100' includes three read heads 2130A-2130C but in alternate embodiments the feedback system 2100' may have more or less than three read heads. The read heads 2130A-2130C are shown in the Figure as being arranged around the stator 2110S in a substantially equally spaced manner such that the read heads point radially at the scale 2120. In alternate embodiments, the read heads 2130A-2130C may be arranged around the stator 2110S with any suitable predetermined spacing arrangement and have any suitable orientation with respect to the scale 2120. In one exemplary embodiment, each of the read heads 2130A-2130C may be configured to provide position information corresponding to the distance (e.g. dA, dB, dC) between the point on the scale 2120 that a respective read head is viewing and an origin SO of the scale 2120. This information, for example, may be used to determine the eccentricity and orientation of the rotor 2110R with respect to the stator 2110S. In alternate embodiments the read heads 2130A-2130C may provide any suitable information for determining the eccentricity and orientation of the rotor 2110R with respect to the stator 2110S. It is noted that the distances dA, dB, dC shown in FIG. 18 are shown extending in a clockwise direction but in alternate embodiments the distance may be in a counterclockwise direction depending on, for example, the direction of rotation of the rotor 2110R.

Referring now to FIG. 19 the determination of the eccentricity and orientation of the rotor 2110R using tangential position measurements from four read heads 2230A-2230D will be described in accordance with an exemplary embodiment. However, it is noted that the exemplary equations described below corresponding to the four read heads 2230A-2230D may be adapted for any suitable number of read heads such that the eccentricity and rotational position of the rotor 2110R may be determined.

As may be realized, during the operation of the motor 2110 the rotor 2110R may deviate from a first center of rotation C to a second center of rotation C1. This deviation may be due to, for example, radial and/or axial loads applied to the rotor. The feedback system 2100" may be configured to calculate the deviation as well as the rotational orientation of the rotor 2110R. In the exemplary positional determination described below it is assumed that the distances d1-d4 increase as the rotor 2110R turns in a counterclockwise direction. However, in alternate embodiments it may be assumed that the distances d1-d4 increase as the rotor 2110R turns in a clockwise direction where appropriate changes are made to the equations described below.

As a non-limiting example, in this exemplary embodiment the eccentricity or deviation from the center point C can be found using the following equations:

$$x_0 = r \cos [(d_2 - d_4)/(2r)] \quad (100)$$

$$y_0 = r \cos [(d_2 - d_4)/(2r)] \quad (101)$$

where $x_0$ and $y_0$ respectively denote the x and y components of the eccentricity of the rotor 2110R. As may be realized from the above equations the eccentric distance $x_0$ may be found using an angle corresponding to the arc length 2240X as tangentially measured by the read heads 2230D and 2230B. Similarly the eccentric distance $y_0$ may be found using an angle corresponding to the arc length 2240Y as tangentially measured by the read heads 2230C and 2230A. The rotational orientation or position of the rotor can be found using the following equations:

$$\theta_1 = d_1/r - \operatorname{asin}(y_0/r) \quad (102)$$

$$\theta_2 = d_2/r - 3\pi/2 + \operatorname{asin}(x_0/r) \quad (103)$$

$$\theta_3 = d_3/r - \pi + \operatorname{asin}(y_0/r) \tag{104}$$

$$\theta_4 = d_4/r - \pi/2 - \operatorname{asin}(x_0/r) \tag{105}$$

$$\theta_0 = \sum_{i=1}^{4} \theta_i/4 = (d_1 + d_2 + d_3 + d_4)/(4r) - 3\pi/4 \tag{106}$$

where $\theta_0$ is the orientation of the rotor 2110R. $\theta_1$-$\theta_4$ respectively denote the angle between the read heads 2230A-2230D and the origin SO of the scale 2120. The distances between the scale origin SO and the read heads 2230A-2230D are respectfully denoted as $d_1$-$d_4$. The radius of the scale 2120 is denoted by the indicator r. The above equations may provide a substantially exact determination of the position (i.e. eccentricity) of the rotor 2110R in the X-Y plane and the rotational orientation $\theta_0$ of the rotor 2110R with respect to any desired reference point.

In another example, approximations of the eccentricity and rotational orientation 80 of the rotor may also be determined without evaluating trigonometric functions. The positional approximations can be determined using the following equations:

$$x_0 = -(d_2 - d_4 - \pi r)/2 = (d_4 - d_2 + \pi r)/2 \tag{107}$$

$$y_0 = -(d_3 - d_1 - \pi r)/2 = (d_1 - d_3 + \pi r)/2 \tag{108}$$

$$\theta_1 = (d_1 - y_0)/r \tag{109}$$

$$\theta_2 = (d_2 - 3\pi r/2 + x_0)/r \tag{110}$$

$$\theta_3 = (d_3 - \pi r + y_0)/r \tag{111}$$

$$\theta_4 = (d_4 - \pi r/2 - x_0)/r \tag{112}$$

$$\theta_0 = \sum_{i=1}^{4} \theta_i/4 = (d_1 + d_2 + d_3 + d_4)/(4r) - 3\pi/4 \tag{113}$$

where $\theta_p$, $\theta_1$-$\theta_4$, $d_1$-$d_4$ and r denote the same features as described above.

It should be realized that the above solutions for determining the eccentricity (i.e. $x_0$ and $y_0$) and rotational orientation (i.e. $\theta_0$) of the rotor 2110R are for exemplary purposes only and that other solutions for determining the eccentricity and rotational orientation using tangential position measurements may be used.

Figure 20A:
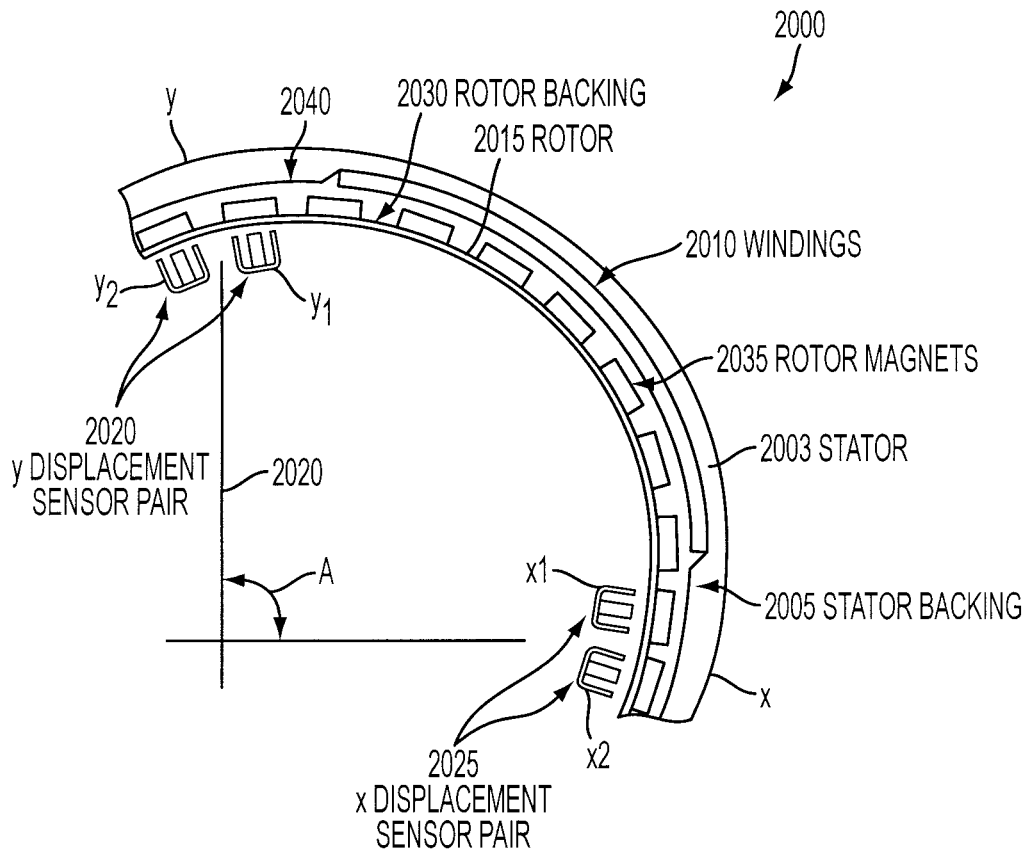
FIGS. 20A and 20B show additional embodiments for providing displacement measurement of a rotor using a plurality of sensor sets.

Turning now to FIG. 20A, another embodiment may provide measurement of an X-Y displacement of a rotor using a plurality of sensor sets, in this example, two sets of sensors. FIG. 20A shows an exemplary embodiment including a portion of a motor 2000 having a stator 2003 with a stator backing 2005 and one or more windings 2010, a rotor 2015, and at least two sensor pairs 2020, 2025. The rotor 2015 may include a rotor backing 2030 on which may be mounted a number of rotor magnets 2035.

In this embodiment, sets of sensors are used to detect displacement of the rotor 2015 with respect to the stator 2003, in particular a displacement along the gap 2040 between the stator 2003 and the rotor 2015. For example, a first set of sensors 2020 measures the displacement at a first location Y while a second set of sensors 2025 measures the displacement at a second location X at an angular offset A from the first location Y. While in this embodiment, the locations are offset by 90 degrees, it should be understood that any suitable angular offset may utilized. Each sensor set may include two sensor systems, X1 X2 in sensor set 2025 and Y1 Y2 in sensor set 2020. Each sensor set may include additional sensor systems in other embodiments. Each sensor system may be similar to sensor system 1500 in FIG. 15. The sensor systems in each set generally have magnetic sources with opposing polarities.

Figure 20B:
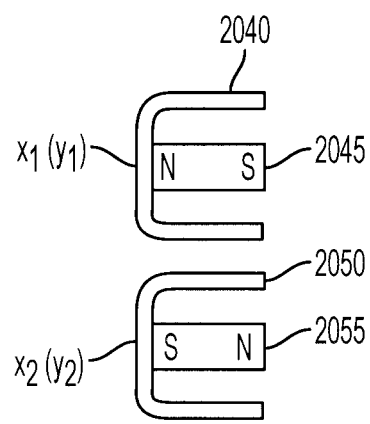

As shown in FIG. 20B, sensor systems X1 (or Y1) includes a ferromagnetic element 2040 and a magnetic source 2045 and sensor systems X2 (or Y2) includes a ferromagnetic element 2050 and a magnetic source 2055. Magnetic sources 2045 and 2055 are positioned in opposing polarity. As an example, and as shown in FIG. 20B, sensor systems X1 and Y1 have the North pole N of the magnetic source 2045 facing inward of the ferromagnetic element 2040, while sensor systems X2 and Y2 have the South pole S of the magnetic source 2055 facing inward of the ferromagnetic element 2050. Extraneous magnetic fields such as those caused by eddy currents have opposite effects on each sensor system within each pair of sensor systems. Thus, the effects of such extraneous fields may be eliminated by taking an average of the outputs of each sensor system within each pair. Noise attenuation may be advantageously improved using these arrangements and techniques.

Figure 21:
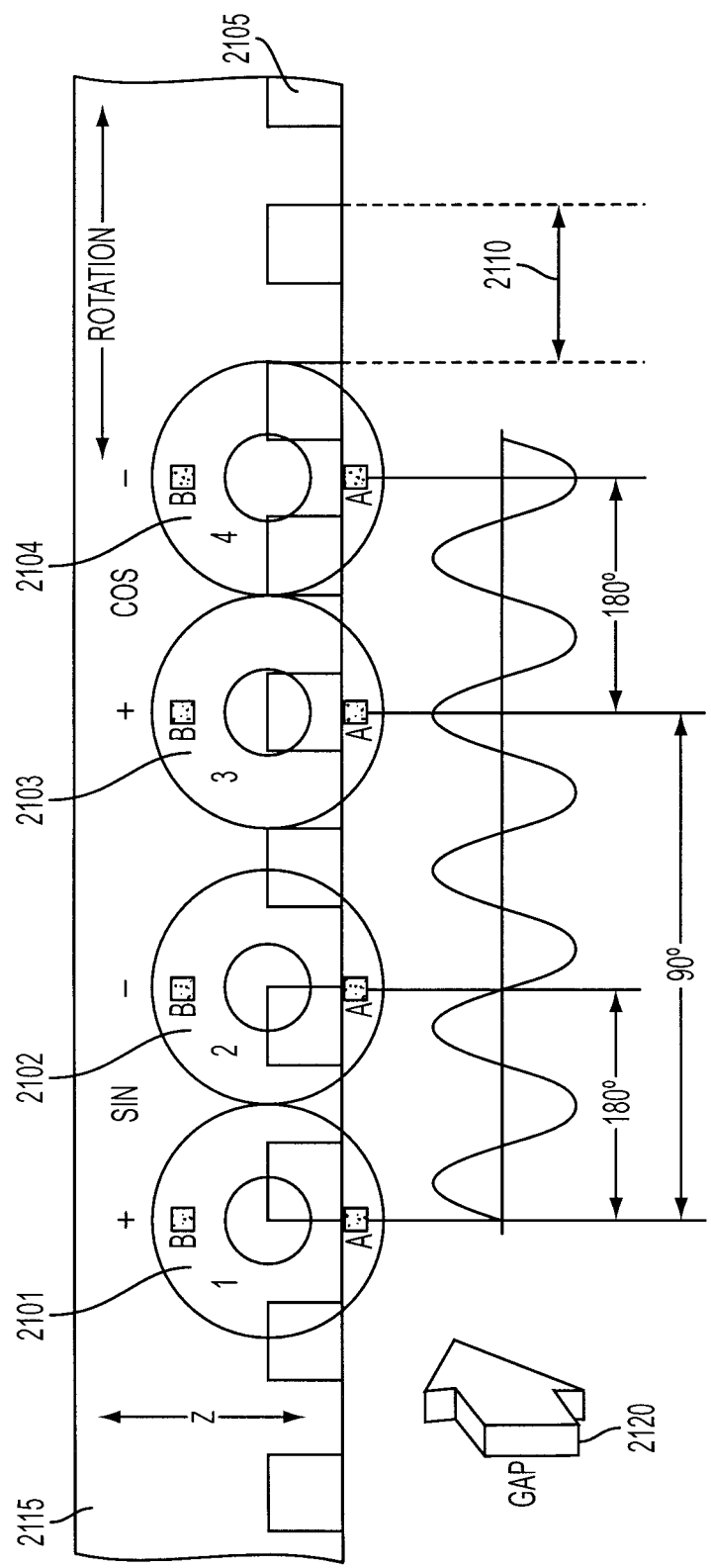
FIG. 21 shows an embodiment where sensor systems are used to read a scale.

FIG. 21 shows an embodiment similar to the embodiment shown in FIG. 7 where sensor systems are used to read an incremental track to produce sine and cosine signals. The embodiment of FIG. 21 may use 4 sensor systems. Each sensor system may be similar to sensor system 1500 in FIG. 15. The sensor systems of FIG. 21 may be positioned to produce sine and cosine signals with no DC offset and an amplitude that is invariant to small changes in displacement along the Z axis and the gap separating the sensor systems and the incremental track.

In FIG. 21, sensor systems 2101 2102 2103 2104 are positioned along an incremental scale 2105 which may have a regularly spaced tooth pitch 2110 and an area with a flat face 2115. In this embodiment. sensor systems 2101 and 2102 are positioned as a first pair along the scale 2105 to output a sine signal and sensor systems 2103 and 2104 are positioned as a second pair along the scale 2105 to output a cosine signal. Sensor systems within each pair may be offset by 180 degrees while corresponding sensor systems in the first pair are offset from corresponding sensor systems in the second pair by 90 degrees. Each sensor system 2101 2102 2103 2104 may have at least two magnetic sensors A and B. The A sensors may be positioned to read the tooth profile of the incremental scale 2105. A change in displacement along the Z axis and along the gap of the A sensors or the scale 2105 will generally affect both the signal amplitude and DC offset of the A sensors. The B sensors may be positioned to read only the flat face area 2115 of the scale 2105. As a result, signals output by the B sensors may not be affected by displacement along the Z axis, but may only be affected by changes along the gap 2120.

By combining signals from the A and B sensors, a sine or cosine signal that is invariant to changes in displacement along the gap may be obtained. In addition, the outputs of sensors within each pair of sensor systems may be 180 degrees out of phase and thus may vary in the same direction as a result of any displacement along the Z axis. By combining the signals from sensors A and B within each pair of sensor systems, a sine or cosine signal that is invariant to displacement along the Z axis and the gap 2120, with no DC offset may be obtained.

The disclosed embodiments provide techniques for determining a rotational position of a rotor without invading an isolated environment in which the rotor may operate, without requiring electronics or sensors within the isolated environment. In one embodiment, a single scale may be used to determine both an absolute and an incremental position.

The presently disclosed embodiments also provides a sensor system with a unique arrangement of a ferromagnetic element a magnetic source and magnetic sensors that generates uniform magnetic flux density lines such that the sensors may be placed in a orbital configuration around the magnetic source.

The disclosed embodiments also provide a feedback system for a motor that includes a unique structure and technique for determining eccentricity and rotational position of a rotor of the motor.

It should be understood that the foregoing description is only illustrative of the present embodiments. Various alternatives and modifications can be devised by those skilled in the art without departing from the embodiments disclosed herein. Accordingly, the embodiments are intended to embrace all such alternatives, modifications and variances which fall within the scope of the appended claims.

What is claimed is:

1. A substrate transport sensing mechanism comprising:
   a rotor magnetic source on a substrate transport motor rotor and having a ferromagnetic target coupled thereto;
   a plurality of read heads, each read head having
      a sensor magnetic source disposed adjacent the ferromagnetic target and separated from the ferromagnetic target and rotor magnetic source by an isolation casing,
      a magnetic flux sensor disposed so as to read the sensor magnetic source through the isolation casing, and
      a sensor backing on which the sensor magnetic source and the magnetic flux sensor are mounted, both on a single side of the ferromagnetic target; and
   a circuitry connected to each of the magnetic flux sensors;
   a single absolute scale coupled to the ferromagnetic target;
   wherein:
   the sensor magnetic source and the magnetic flux sensor are arranged to form a magnetic circuit that passes serially through the sensor magnetic source, the ferromagnetic target, the magnetic flux sensor, and the sensor backing,
   the magnetic flux sensor has an output proportional to the intensity of the magnetic flux passing from the ferromagnetic target to the magnetic flux sensor, where the proportionality of the sensor output provides unique correlation to and discriminative of each different distance measure magnitude quantity from each other different distance measure magnitude quantity of a variable radial distance of, and coincident with, a gap between and bounded by a pole surface of the sensor magnetic source and a surface of the single absolute scale coupled to the ferromagnetic target substantially athwart the pole surface of the sensor magnetic source, which gap and the coincident variable radial distance vary normal to the pole surface of the sensor magnetic source in an unknown manner, and
   wherein the circuitry has a configuration that, for each read head:
      processes the magnetic flux sensor output,
      quantifies, based on the unique correlation from the magnetic flux sensor output, a present distance measure magnitude quantity of a present radial distance, from the variable radial distance, of the gap bounded by the pole surface of the sensor magnetic source and the surface of single absolute scale coupled to the ferromagnetic target, and the circuitry outputs a signal that embodies the present distance measure magnitude quantity of the present radial distance, determined based on the unique correlation, between the pole surface of the sensor magnetic source and the surface of the single absolute scale coupled to the ferromagnetic target substantially athwart the pole surface of the sensor magnetic source, and
      simultaneously generates, from the single absolute scale, an absolute rotational position of the single absolute scale and an interpolated incremental rotational position of the single absolute scale within a resolution of the absolute rotational position.

2. The sensing mechanism of claim 1, wherein the magnetic flux sensor is operable to sense variable magnetic flux intensities caused by the single absolute scale and the circuitry outputs a signal that is indicative of an absolute position of the ferromagnetic target.

3. The sensing mechanism of claim 1, wherein the single absolute scale is an absolute digital scale.

4. The sensing mechanism of claim 3, wherein the absolute digital scale is a single track Gray code scale.

5. The sensing mechanism of claim 1, wherein the circuitry outputs the signal indicative of the incremental interpolated position between successive measured absolute positions of the single absolute scale coupled to the ferromagnetic target.

6. The sensing mechanism of claim 5, wherein the circuitry is configured so that the circuitry processes an analog signal from the magnetic flux sensor and generates the output signal as a digital output pattern indicating the absolute rotational position of the single absolute scale and the interpolated incremental rotational position between the successive measured absolute positions of the single absolute scale, the analog signal including the magnetic flux sensor output.

7. The sensing mechanism of claim 1, wherein each read head is configured to provide position information corresponding to a distance between a point on the single absolute scale facing a respective read head and an origin of the single absolute scale.

8. The sensing mechanism of claim 7, wherein the circuitry is configured to determine an orientation and the present distance measure magnitude quantity of the present radial distance of the substrate transport motor rotor based on the position information corresponding to the distance between the point on the single absolute scale facing the respective read head and the origin of the single absolute scale.

9. The sensing mechanism of claim 1, wherein:
   each of the plurality of read heads, facing the single absolute scale, are configured to provide the magnetic flux sensor output as a signal that embodies a tangential position magnitude quantity based on a translation of the single absolute scale; and
   the circuitry, connected to the plurality of read heads, is configured to determine the absolute rotational position and the interpolated incremental rotational position of the substrate transport motor rotor with respect to a reference frame based on the signal that embodies the tangential position magnitude quantity based on the translation of the single absolute scale.

10. The sensing mechanism of claim 9, wherein the eccentricity and rotational position of the substrate transport motor rotor are simultaneously measured.

11. The sensing mechanism of claim 7, wherein the plurality of read heads are substantially equidistant from each other.

\* \* \* \* \*